US010195810B2

(12) United States Patent
Nakano et al.

(10) Patent No.: US 10,195,810 B2
(45) Date of Patent: Feb. 5, 2019

(54) ELECTRIC PRESS, BEND-POINT DETECTION METHOD, AND PROGRAM

(71) Applicant: Janome Sewing Machine Co., Ltd., Tokyo (JP)

(72) Inventors: Masahiko Nakano, Tokyo (JP); Kenichiro Hiruma, Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 1169 days.

(21) Appl. No.: 14/473,716

(22) Filed: Aug. 29, 2014

(65) Prior Publication Data

US 2015/0068414 A1 Mar. 12, 2015

(30) Foreign Application Priority Data

Sep. 9, 2013 (JP) .................................. 2013-186809

(51) Int. Cl.
*B30B 15/00* (2006.01)
*B30B 15/26* (2006.01)
(Continued)

(52) U.S. Cl.
CPC .............. *B30B 15/26* (2013.01); *B21D 5/004* (2013.01); *B21D 5/006* (2013.01); *B21D 5/02* (2013.01);
(Continued)

(58) Field of Classification Search
CPC ......... B30B 15/00; B30B 15/14; B30B 15/16; B30B 15/22; B30B 15/0094; B30B 15/26;
(Continued)

(56) References Cited

U.S. PATENT DOCUMENTS 5,483,750 A * 1/1996 Ooenoki .................. B21D 5/02
33/534
5,483,874 A * 1/1996 Shimizu .................... B30B 1/18
100/256
(Continued)

FOREIGN PATENT DOCUMENTS

JP H02-047000 A 2/1990
JP H05-329690 A 12/1993
(Continued)

OTHER PUBLICATIONS

Office Action issued in Korean Patent Application No. 10-2014-0104215, dated May 12, 2015, with English Translation (11 pages).

*Primary Examiner* — Jimmy T Nguyen
(74) *Attorney, Agent, or Firm* — Nakanishi IP Associates, LLC

(57) ABSTRACT

A detection unit for detecting a data row of a press position and a load at the press position; an input/storage unit for storing at least a load value serving as references for determining stop or judge; a calculation unit of the value of the slope of the load for calculating the value of the slope of the load based on the press position and the load at the press position detected; a calculation unit of the value of the slope of the slope of the load for calculating the value of the slope of the slope of the load based on the calculated value of the slope of the load; and a determination unit for comparing the calculated value of the slope of the slope of the load with the values serving as the references to determine stop or judge are provided.

5 Claims, 31 Drawing Sheets

(51) Int. Cl.
*B21D 5/02* (2006.01)
*G05B 19/37* (2006.01)
*G05B 19/41* (2006.01)
*B21D 5/00* (2006.01)
*B30B 1/18* (2006.01)

(52) U.S. Cl.
CPC .......... *B30B 1/186* (2013.01); *B30B 15/0094* (2013.01); *G05B 2219/37403* (2013.01)

(58) Field of Classification Search
CPC .. B30B 1/18; B30B 1/186; B30B 1/23; B30B 1/24; B30B 1/32; B30B 13/00; G05B 2219/36486; G05B 2219/37403; G05B 2219/37582; G05B 2219/45143; B21D 5/01; B21D 5/004; B21D 5/006; G06F 19/00
USPC ........................................... 100/35, 342, 346
See application file for complete search history.

(56) References Cited

U.S. PATENT DOCUMENTS

| | | | | |
|---|---|---|---|---|
| 5,564,298 A | * | 10/1996 | DeMeo | B30B 15/0094 72/19.8 |
| 5,669,257 A | * | 9/1997 | Inoue | B30B 1/266 72/20.1 |
| 5,857,366 A | * | 1/1999 | Koyama | B21D 5/004 72/17.3 |
| 6,293,155 B1 | | 9/2001 | Babiel | |
| 6,832,526 B2 | * | 12/2004 | Koyama | B21D 5/02 73/849 |
| 6,941,784 B2 | * | 9/2005 | Koyama | B21D 5/02 72/31.01 |
| 7,503,200 B2 | * | 3/2009 | Gerritsen | B21D 5/0272 100/258 A |
| 8,534,105 B2 | * | 9/2013 | Shibata | B21D 5/004 72/31.01 |
| 2002/0011206 A1 | | 1/2002 | Yamazaki et al. | |
| 2003/0205150 A1 | * | 11/2003 | Nagae | B30B 1/268 100/280 |

FOREIGN PATENT DOCUMENTS

| | | |
|---|---|---|
| JP | H06-218591 A | 8/1994 |
| JP | H09-236530 A | 9/1997 |
| JP | 2002-035864 A | 2/2002 |
| JP | 2009-279603 A | 12/2009 |
| JP | 2010-264480 A | 11/2010 |
| JP | 2013-107098 A | 6/2013 |
| KR | 10-2008-0105938 A | 12/2008 |

* cited by examiner

Prior Art

ELECTRIC PRESS, BEND-POINT DETECTION METHOD, AND PROGRAM

CROSS REFERENCE TO RELATED APPLICATIONS

This application is based on and claims the benefit of priority to Japanese Patent Application No. 2013-186809 filed on Sep. 9, 2013, the contents of which are hereby incorporated by reference in their entirety.

TECHNICAL FIELD

The present invention relates to an electric press, a bend-point detection method, and a program that detect a bend point of a position/load graph in a significant form in a press operation.

BACKGROUND ART

Conventionally, press apparatuses (electric press, electro press) have been known for carrying out a press-fitting operation, etc. in assembly of small components, etc. as shown in FIG. 1 (For example, see Patent Literature 1.).

In a press-fitting operation of such a press apparatus (electric press, electro press), in some cases, it is desired to make a certain determination or stop the press-fitting operation at a point of time (position) when a condition(s) is changed during the press-fitting.

Herein, the above described change of the condition appears as a bend point in a graph of position/pressurization-load as shown in FIG. 30. In order to detect this bend point, there is a method that focuses on the slope thereof. More specifically, a point of time (position) at which the slope exceeds a certain setting is obtained. This method has been conventionally realized as functions such as differential judge and differential stop.

The above described method is an effective method under predetermined conditions. However, on the other hand, if it focuses on the "slope", in other words, the change rate of the load, the bend point cannot be precisely detected in some cases. For example, since the values of the slopes are varied depending on individual parts, a slope that serves as a determination reference cannot be set in some cases.

In such a case, it is conceivable to capture an essential characteristic of "inflection point" that "the change rate of the change rate of load" has an extremum. However, calculating "the change rate of the change rate of load", in other words, obtaining a second-order differential value is to obtain a second-order difference if positions and load values are digitized discrete values.

PRIOR ART LITERATURE

Patent Literature

[Patent Literature 1] Japanese Patent Application Laid-Open No. H05-329690

SUMMARY OF THE INVENTION

However, it is difficult to calculate the slope of the slope of the load based on actually detected load values and make a determination by that. Even the slope of the load has a difficult aspect, and, in the case of the slope of the slope of the load, local vibrations are picked up, and determination is difficult. The calculation of the slope corresponds to a differential operation in other words, and the differential operation is an operation in which a doubled frequency has a doubled value when considered in a frequency domain. Therefore, high-frequency components are enlarged, data is buried in noise as a result, and it is difficult to obtain a significant value.

Based on actual data of press-fitting, an example that draws a position/simple-second-order-difference graph (lower graph in FIG. 31) is shown in FIG. 31. "Simple second-order differences" referred to herein provide the slope of the slope of the load by simply obtaining the differences of differences. In an original graph of position/load (upper graph in FIG. 31), it is observed that a bend point is at around a position of 93.8 mm. However, when the graph of the simple second-order differences thereof is viewed, a peak is certainly present also near the bend point; however, in addition to that, peaks are also at, for example, a press-fitting start part and before and after the bend. In terms of only the largeness of the values, a point slightly after 94 mm has a maximum value.

Particularly, if there are speed variations, local variations in the amounts of changes (differences) in the positions corresponding to the denominator of the division of the slope calculation largely affect calculated values, and it is therefore difficult to obtain significant values. Basically, the calculation is carried out by "load slope"="the amount of change in load"/"the amount of change in position", and, if the amount of change in the position is extremely small, the values of the load slope, which is the calculation result, do not become significant. This is for a reason that both of the amount of change in the load and the amount of change in the position become minute values, and divided values do not have significance almost at all.

Also in the example of a graph shown in a lower part of FIG. 31, the speed is low at a press-fitting start part in the anterior half, and some peaks appear in the anterior-half part since there are speed variations. It is also a fact that a bend point is present; however, variations thereof are large, and the significance thereof is lost. Therefore, conventionally, bend-point detection using second-order differentials has not been carried out.

Therefore, one or more embodiments of the present invention provide an electric press, a bend-point detection method, and a program that detect a bend point of a position/load graph in a significant form in a press operation.

One or more embodiments of the present invention provide below items in order to solve the above described issues.

Embodiment (1)

One or more embodiments of the present invention provide an electric press having: a detection unit for detecting a data row of a press position and a load at the press position; an input/storage unit for inputting and storing a load value, a value of a slope of the load, a value of a slope of the slope of the load serving as references for determining stop or judge; a calculation unit of the value of the slope of the load for calculating the value of the slope of the load based on the press position and the load at the press position detected; a calculation unit of the value of the slope of the slope of the load for calculating the value of the slope of the slope of the load based on the calculated value of the slope of the load; and a determination unit for comparing the calculated value of the slope of the slope of the load with the values serving as the references to determine stop or judge.

Embodiment (2)

One or more embodiments of the present invention provide the electric press of (1), having a data-row calculation unit for calculating a data row of a press position and a load at a constant distance interval based on the data row of the press position and the load detected.

Embodiment (3)

One or more embodiments of the present invention provide the electric press of (1) having a data-row calculation unit for calculating a data row of a press position and a load at a constant interval in space of the press position and the load based on the data row of the press position and the load detected.

Embodiment (4)

One or more embodiments of the present invention provide the electric press of (1) and (2), wherein the calculation unit of the value of the slope of the load and the calculation unit of the value of the slope of the slope of the load calculate the value of the slope of the load and the value of the slope of the slope of the load by using a regression line.

Embodiment (5)

One or more embodiments of the present invention provide the electric press of (1) and (2), wherein the calculation unit of the value of the slope of the load and the calculation unit of the value of the slope of the slope of the load smooth the press position and the load at the press position detected and calculate the value of the slope of the load and the value of the slope of the slope of the load based on the press position and the load at the press position smoothed.

Embodiment (6)

One or more embodiments of the invention provide a bend-point detection method of an electric press having at least a detection unit, an input/storage unit, a calculation unit of a value of a slope of a load, a calculation unit of a value of a slope of the slope of the load, and a determination unit; the method including: a first step of detecting a data row of a press position and the load at the press position by the detection unit; a second step of inputting and storing a load value, the value of the slope of the load, the value of the slope of the slope of the load serving as references for determining stop or judge by the input/storage unit; a third step of calculating the value of the slope of the load based on the press position and the load at the press position detected by the calculation unit of the value of the slope of the load; a fourth step of calculating the value of the slope of the slope of the load based on the calculated value of the slope of the load by the calculation unit of the value of the slope of the slope of the load; and a fifth step of comparing the calculated value of the slope of the slope of the load with the values serving as the references to determine stop or judge by the determination unit.

Embodiment (7)

One or more embodiments of the present invention provide apparatus comprising a non-transitory computer readable storage medium, having a computer program encoded thereon and stored in a computer readable format, the computer program being executable by a computer to cause the computer to execute a bend-point detection method of an electric press comprising at least a detection unit, an input/storage unit, a calculation unit of a value of a slope of a load, a calculation unit of a value of a slope of the slope of the load, and a determination unit; the bend-point detection method of an electric press comprising: a first step of detecting a data row of a press position and the load at the press position by the detection unit; a second step of inputting and storing a load value, the value of the slope of the load, the value of the slope of the slope of the load serving as references for determining stop or judge by the input/storage unit; a third step of calculating the value of the slope of the load based on the press position and the load at the press position detected by the calculation unit of the value of the slope of the load; a fourth step of calculating the value of the slope of the slope of the load based on the calculated value of the slope of the load by the calculation unit of the value of the slope of the slope of the load; and a fifth step of comparing the calculated value of the slope of the slope of the load with the values serving as the references to determine stop or judge by the determination unit.

According to one or more embodiments of the invention, there are effects that the slope of the slope of the load can be calculated as significant amounts and that the bend point can be detected based on that. Moreover, even in a case in which speed variations are generated intentionally or unintentionally, there is an effect that significance can be ensured by calculating the slope of the slope of the load after data at a constant distance interval is obtained as a preprocessing stage provided herein.

Moreover, there is an effect that erroneous detection can be actually prevented by using the three values of the load, the slope of the load, and the slope of the slope of the load provided herein as determination references. Furthermore, there is also an effect that, even in an operation in which the load value and the slope of the load are varied depending on a work, control (stop) or pass/not-pass judgement can be carried out by calculating the significant slope of the slope of the load and detecting the bend point without erroneous detection.

BRIEF DESCRIPTION OF DRAWINGS

FIG. 9 is a graph in which FIG. 5, FIG. 6, and FIG. 8 are mutually overlapped.

DETAILED DESCRIPTION OF PREFERRED EMBODIMENTS

Hereinafter, embodiments of the present invention will be explained in detail by using drawings.

Note that constituent elements in the present embodiments can be arbitrarily replaced with existing constituent elements, etc., and various variations including combinations with other existing constituent elements can be also employed. Therefore, the description of the present embodiments does not limit the substance of the invention described in claims.

Embodiment

An embodiment of the present invention will be explained by using FIG. 1 to FIG. 29.

Figure 1:
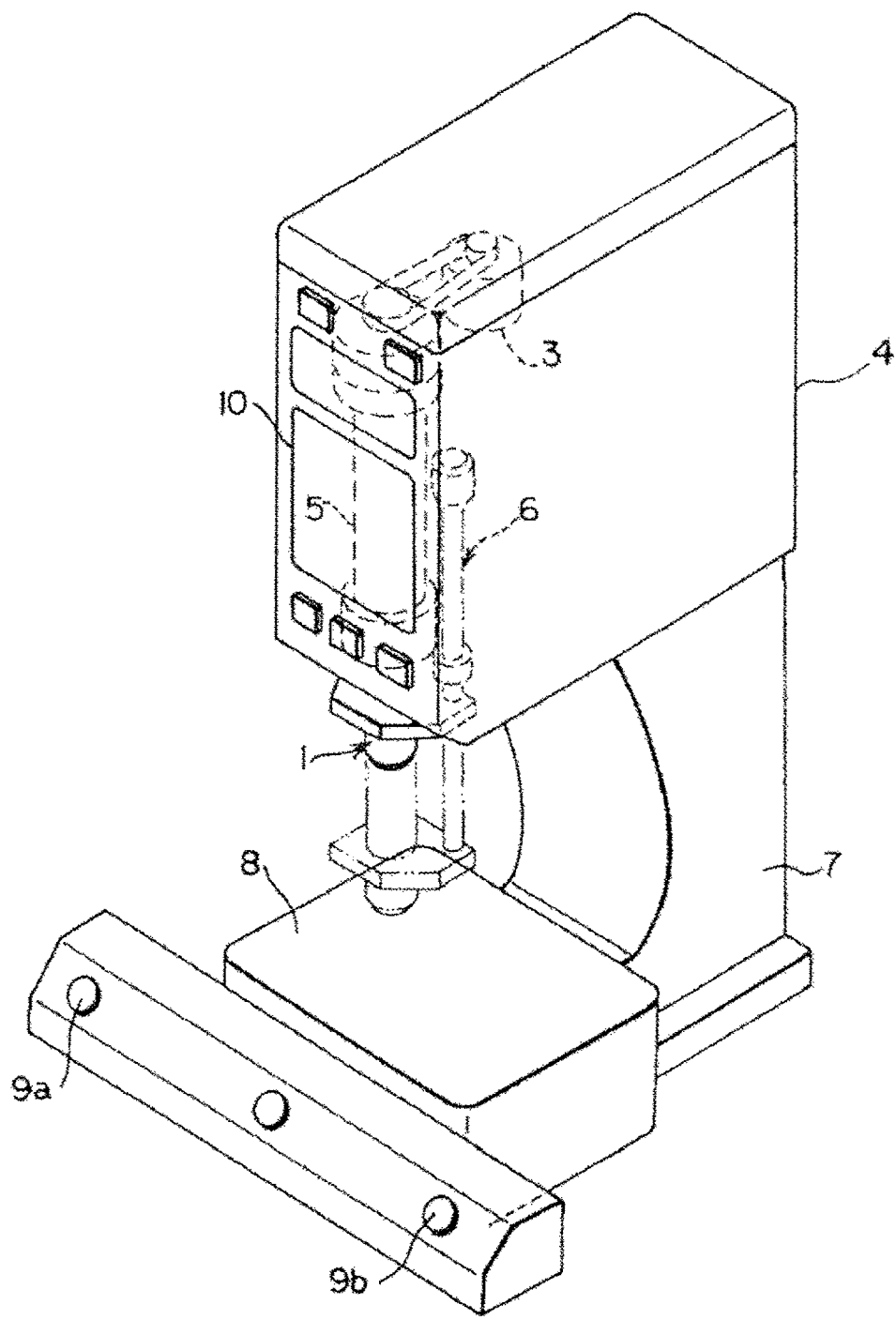
FIG. 1 is an overall view of an electric press according to one or more embodiments of the present invention.
Figure 2:
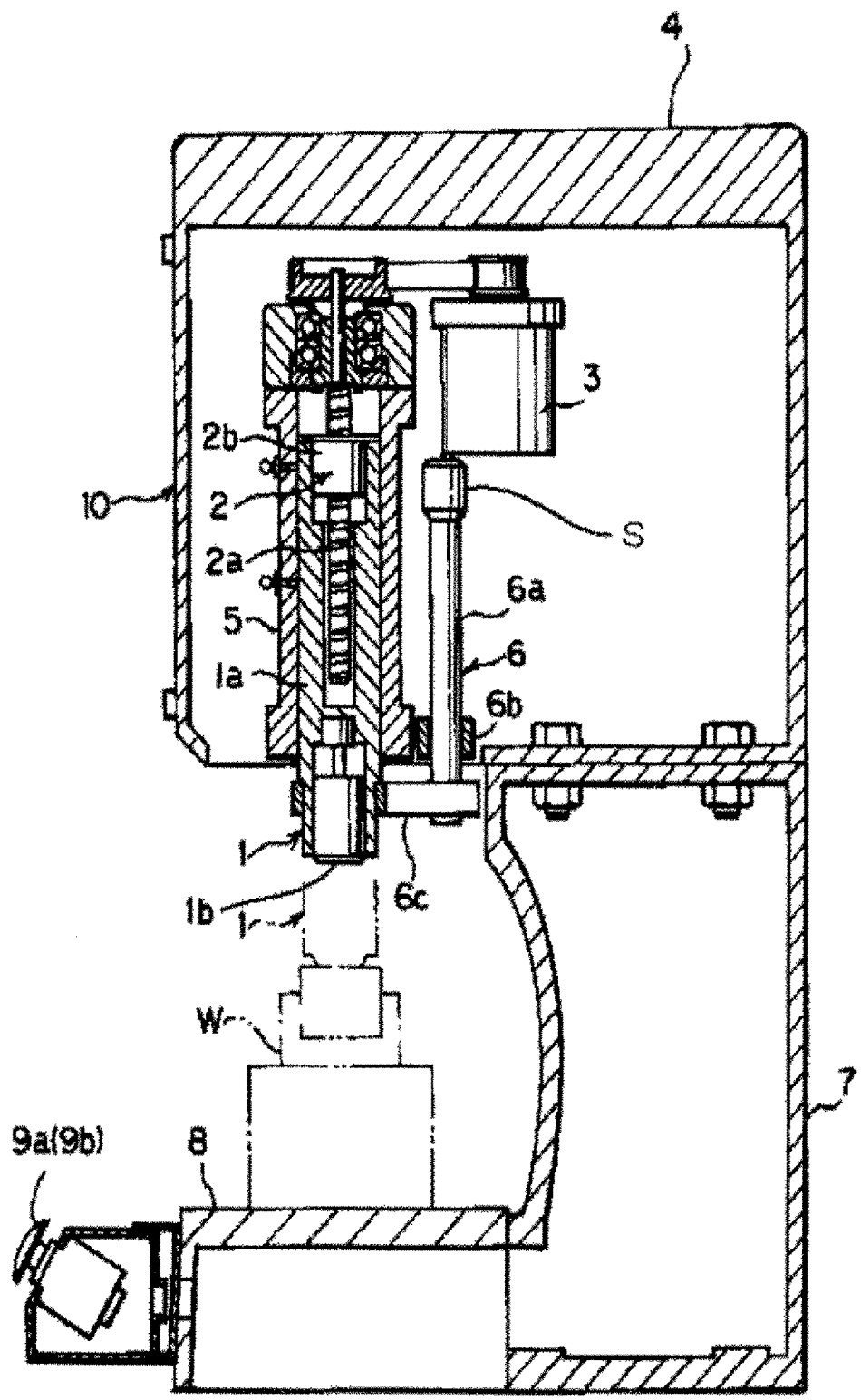
FIG. 2 is a cross-sectional view of an electric press according to one or more embodiments of the present invention.

As shown in FIG. 1 and FIG. 2, an electric press according to the present embodiment consists of: a pressing ram 1, which applies a desired pressure to a workpiece W by up/down movement; a ball screw 2, which applies the up/down movement to the ram 1; and an electric motor 3. These are provided in a head frame body of a casing 4.

First, as shown in FIG. 1, the structure of the ram 1 is formed into a tubular body. Specifically, a hollow part is formed in a tubular main body 1a, which is formed into a cylindrical shape, along the axial direction thereof, a screw shaft 2a of the ball screw 2 can be inserted in the hollow part, and a nut body 2b of the ball screw 2 is fixed to a shaft-length-direction end location of the tubular main body 1a of the ram 1.

A pressing body 1b is configured to be attachable to a lowermost part of the tubular main body 1a. In practice, the pressing body 1b abuts the workpiece W and applies an arbitrary pressure thereto. Furthermore, in some cases, a strain gauge is configured to be attachable to the pressing body 1b so that the pressure applied to the workpiece W can be detected by the strain gauge.

A tubular guide 5 is provided so as to surround an outer peripheral side surface of the tubular main body 1a. The tubular guide 5 is fixed in the casing 4, and the ram 1 is configured to be movable upward/downward along the tubular guide 5. The ram 1 is provided with an anti-vibration guide 6 so as not to rotate on a plane orthogonal to the axial direction. Specifically, as show in FIG. 1 and FIG. 2, the anti-vibration guide 6 consists of an anti-vibration rod 6a, a guiding part 6b, and a coupling plate 6c; the anti-vibration rod 6a is provided via the coupling plate 6c so as to be directed upward from a lower end location of the ram 1 and be parallel to the ram 1; and the anti-vibration rod 6a is configured to be moved in a top-bottom direction along up and down of the ram 1.

Furthermore, the guiding part 6b for causing the anti-vibration rod 6a to pass a predetermined location is fixed in the casing 4, the anti-vibration rod 6a is configured to be moved up and moved down along the guiding part 6b, and the ram 1 is configured so as not to idle in the tubular guide 5 when moved in the top-down direction.

Below the casing 4, a base 8 is provided in the front side via a perpendicular column 7 and immediately below the ram 1, and manipulation buttons 9a and 9b are provided in front of the base 8 and has functions to move down, pause, and move up the ram 1. Specifically, if the ram 1 is to be moved down, the manipulation buttons 9a and 9b are simultaneously pressed; and, if it is to be paused, the manipulation button 9a is pressed, and only the manipulation button 9b is released. Furthermore, the ram 1 is configured to be moved up when the manipulation buttons 9a and 9b are simultaneously released. Moreover, a control unit 10, which is provided in a lateral front side of the casing 4, has a display device 12 and a manipulation device 13.

Figure 3:
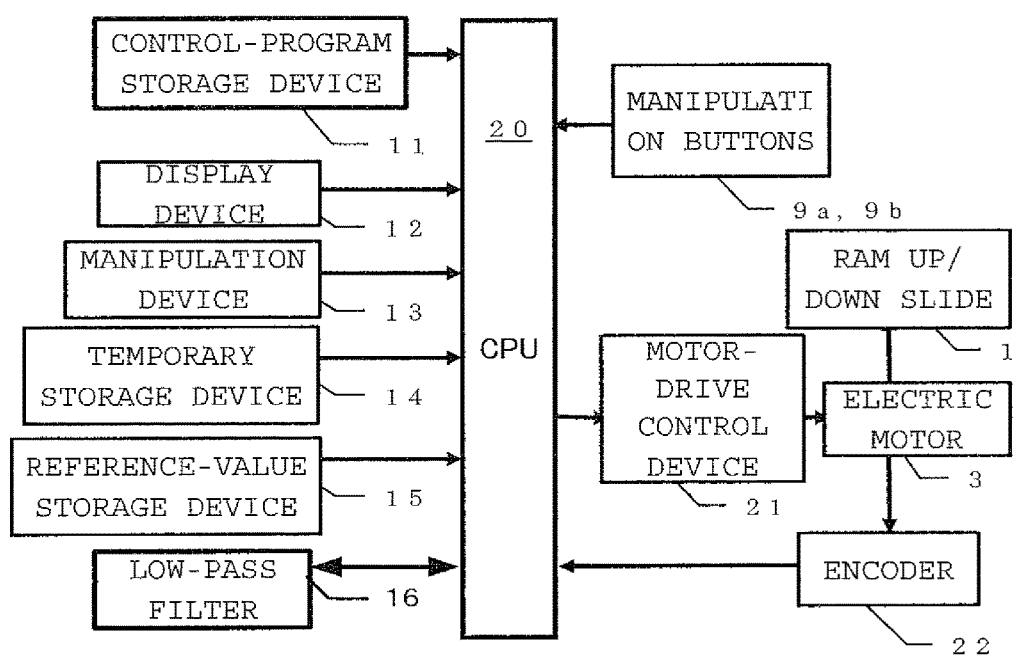
FIG. 3 is a drawing showing a configuration of a control unit of the electric press in one or more embodiments of the present invention.

As shown in FIG. 3, the control unit 10 has a central processing unit 20 and is controlled by a program stored by a control-program storage device 11. Moreover, it has a temporary storage device 14, which stores temporary data, and it further has a reference-value storage device 15, which stores reference values input by using the display device 12 and the manipulation device 13. On the other hand, a motor-drive control device 21 drives the electric motor 3 by commands of the central processing unit 20. An encoder 22, which detects the position of the ram 1, is coupled to the electric motor 3, thereby detecting the moved distance and speed of the ram 1. Moreover, a low-pass filter 16 for carrying out a smoothing process is provided.

Hereinafter, explanations will be given in accordance with a detection process flow of a bend point shown in FIG. 4. First, in step S110, while the ram 1 is moved down, the position of the ram and the load applied to a work are obtained at a constant time interval. The position of the ram can be obtained from the signals from the encoder 22, which is coupled to the electric motor 3, as the moved distance from an initialization position serving as a reference. Moreover, load values can be obtained from the signals from the strain gauge. For example, position/load data as shown in FIG. 5 is obtained. In the graph of FIG. 5, a bend point is observed near a position of 52.8 [mm].

Figure 6:
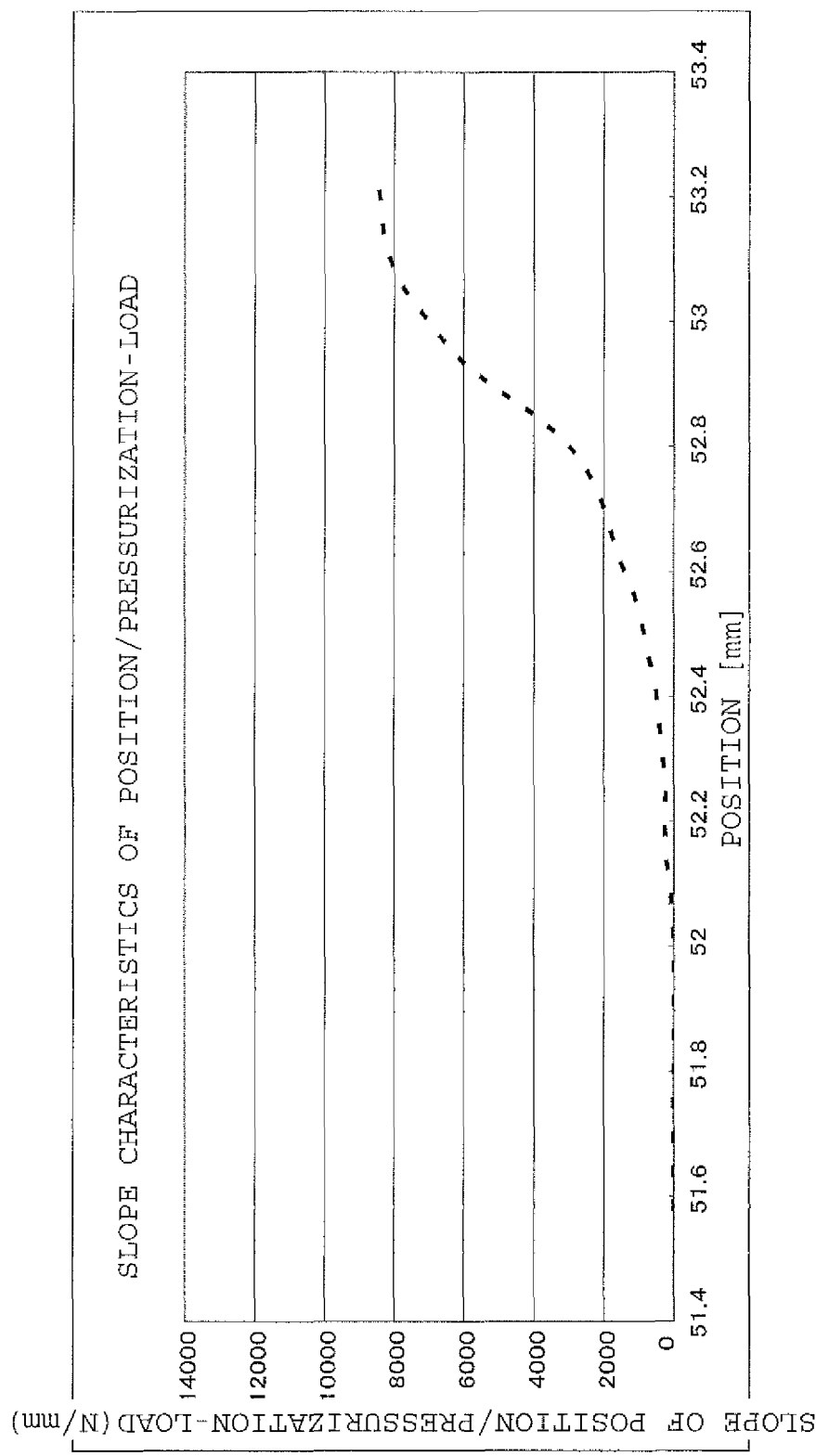
FIG. 6 is a drawing showing the relation of position/load slope data of the electric press in one or more embodiments of the present invention.

Then, in step S140, the slope of the graph (the amount of change of the load value with respect to the position) is calculated by a slope calculating formula of a regression line. For example, regarding n-pieces of data, a position data sequence of a pressurization part is $(x_1, x_2 \ldots x_n)$, and a data sequence of the load is $(y_1, y_2 \ldots y_n)$; in this case, it is assumed that a regression line is drawn with respect to these values. The slope of the regression line is expressed by Formula 1. Thus, the slope of the load, in other words, the values corresponding to first-order differentials are calculated. FIG. 6 shows an example of the graph of the slope of position/load.

$$\text{Slope} = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2} \quad \text{[Formula 1]}$$

Hereinafter, the slope calculation of the regression line will be shown by specific numerical values. For example, there are data sequences of x={1, 3, 4, 6, 7, 10} and y={5.7, 10.4, 11.1, 19.5, 21.8, 26.2}. The slope is calculated by using all of the six pairs of data. In Formula 1, n=6. The results of calculating the terms of sums in Formula 1 are shown in Table 1.

TABLE 1

| I | x | y | xy | $x^2$ |
|---|---|---|---|---|
| 1 | 1 | 5.7 | 5.7 | 1 |
| 2 | 3 | 10.4 | 31.2 | 9 |
| 3 | 4 | 11.1 | 44.4 | 16 |
| 4 | 6 | 19.5 | 117.0 | 36 |
| 5 | 7 | 21.8 | 152.6 | 49 |
| 6 | 10 | 26.2 | 262.0 | 100 |
| Σ | 31 | 94.7 | 612.9 | 211 |

With respect to i of 1 to 6 in a first column, the values of x are provided in a second column, and the vertical sum thereof is shown in a lowermost row Σ. Similarly, y is provided in a third column, xy is provided in a fourth column, $x^2$ is provided in a fifth column, and the sums thereof are shown in the lowermost level. According to these values, the slope according to Formula 1 becomes 2.432 as shown by Formula 2.

{(6×612.9)−(31×94.7)}÷{(6×211)−(31×31)}=741.7÷305=2.432

As reference, an intercept of the regression line is calculated, and the results of obtaining values of y on the regression line (y') from the slope, the intercept, and the values of x are shown in Table 2.

TABLE 2

| I | x | y | y': y on the regression line |
|---|---|---|---|
| 1 | 1 | 5.7 | 5.650 |
| 2 | 3 | 10.4 | 10.514 |
| 3 | 4 | 11.1 | 12.946 |
| 4 | 6 | 19.5 | 17.810 |
| 5 | 7 | 21.8 | 20.241 |
| 6 | 10 | 26.2 | 27.537 |

Figure 7:
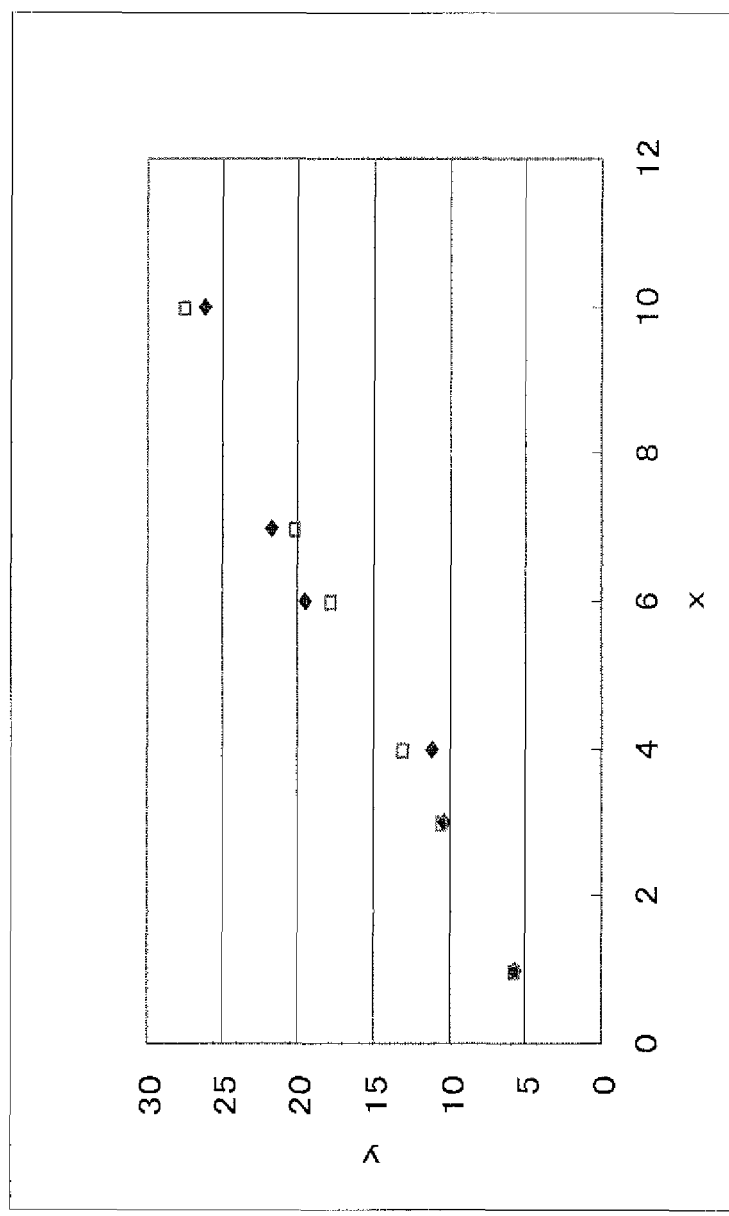
FIG. 7 is a graph showing data sequences of x and y (original data) of the electric press in one or more embodiments of the present invention and the values of y on a regression line (y').

Note that the results of showing the data sequences (original data) of x and y of Table 2 by black points and showing the values (y') of y on the regression line by hollowed points are as shown in FIG. 7.

In the above described manner, the slope of the load, in other words, the values corresponding to the amounts of changes with respect to the positions can be calculated by Formula 1 for obtaining the slope of the regression line. FIG. 7 shows a graph of the slope of the regression line obtained based on the data sequences of position/load shown in FIG. 6. It can be understood from this graph that the slope is increased from around the position of 52.8 mm, the amount of increase thereof is reduced from a point after a position of 53 mm, and the slope becomes approximately constant at 8000 [N/mm].

Figure 8:
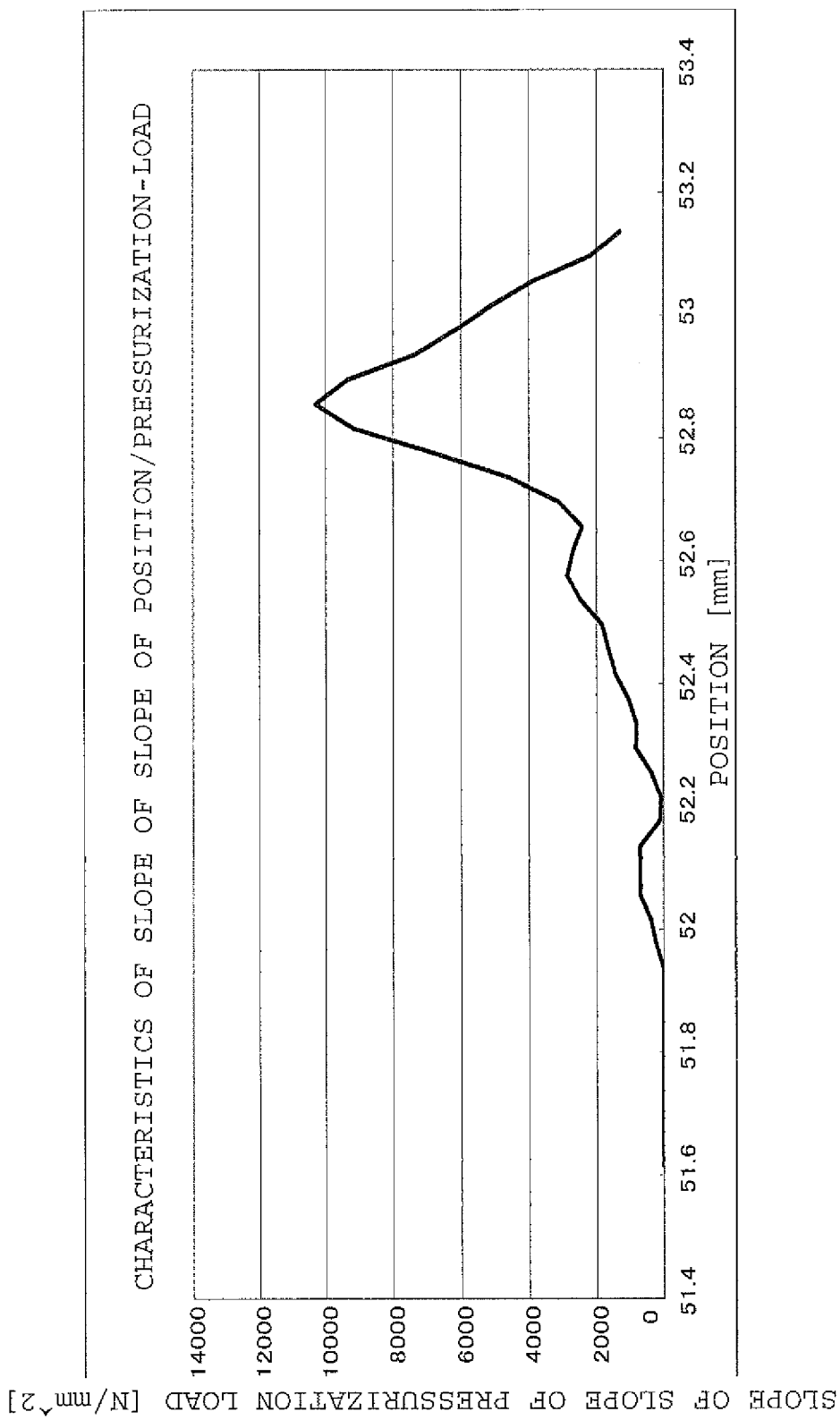
FIG. 8 is a drawing showing the relation of slope data of the slope of position/pressurization-load of the electric press in one or more embodiments of the present invention.
Figure 9:
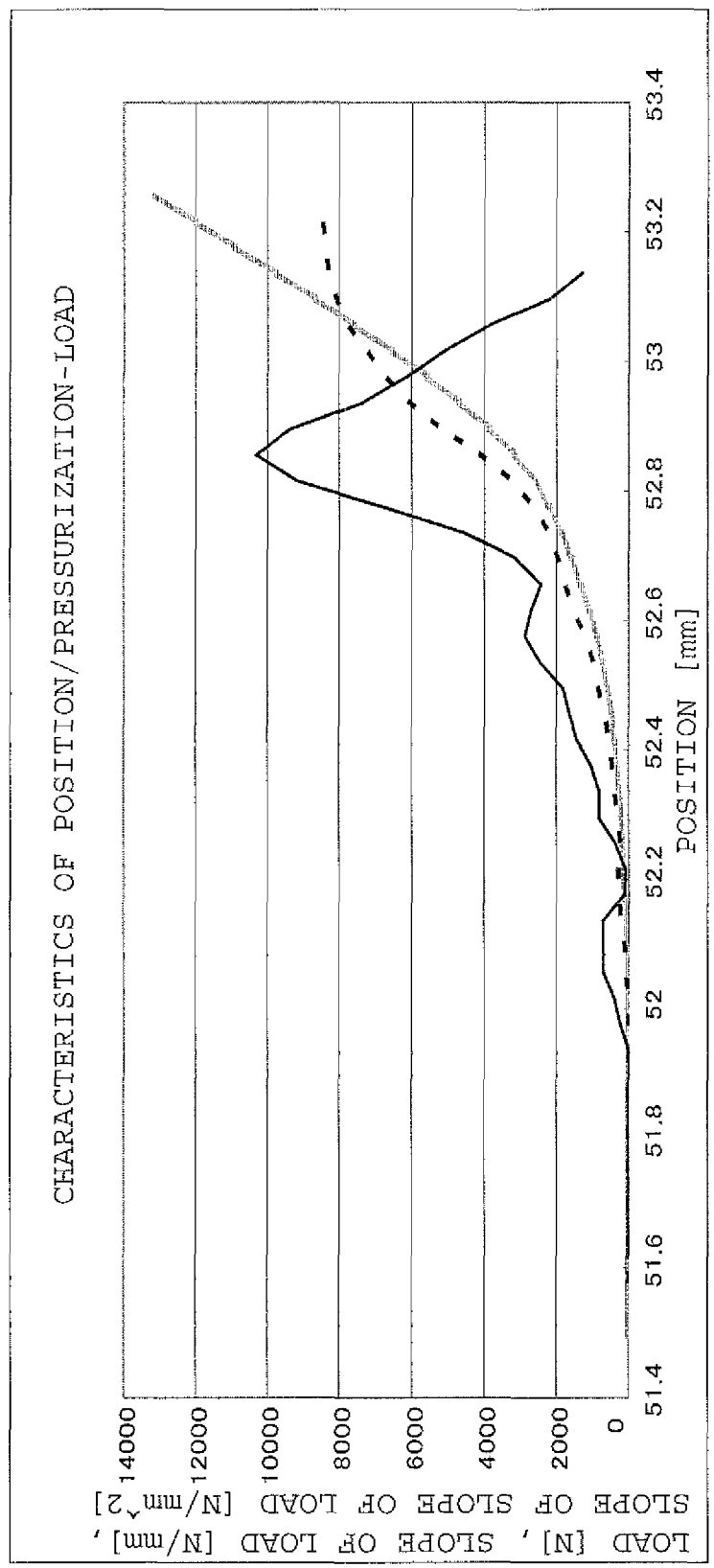

In step S160, based on the data of the slope, the slope of the slope of the load is calculated as the amounts of changes of the amounts of changes of the load values with respect to the positions by using Formula 1 for calculating the slope of a regression line again. The calculation per se is similar. A graph of the slope of the slope of position/pressurization-load obtained as a result is shown in FIG. 8. It can be understood from this graph that a peak is at a point slightly after the position of 52.8 mm. FIG. 9 shows a graph in which FIG. 5, FIG. 6, and FIG. 8 are mutually overlapped. The vertical direction thereof is in an appropriate scale so as to facilitate viewing.

Then, in step S140, a reference set value, which is set in advance, and the calculated value of the slope of the slope of the load are compared with each other, a point that exceeds the reference set value is determined as a bend point, and, when the bend point is determined, movement of the pressurization part is stopped.

On the other hand, in detection of a bend point, speed variations of the pressurization part are a problematic point for carrying out a process based on the data of the positions and loads at a constant time interval. The speed of the pressurization part is intentionally/unintentionally varied. As an intentional speed change, at the part that is brought into contact with the work, the speed is reduced to suppress impact with respect to the work. In the pressurization operation, the speed is desired to be increased as much as possible in order to shorten takt time. Moreover, in a last stage of pressurization, the speed is reduced in order to prevent overshoot. It is one of the characteristics of the electric press that the speed can be freely changed. On the other hand, since the hardness (spring constant) of the work is changed, unintentional variations of the speed also occur as a result.

Figure 10:
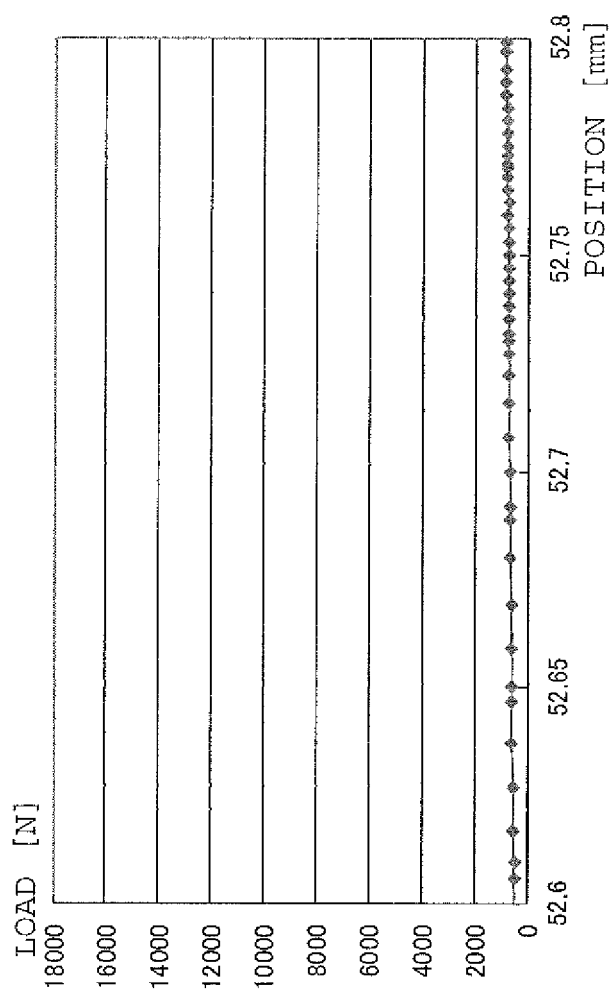
FIG. 10 is a graph of position/load in which speeds are varied.
Figure 11:
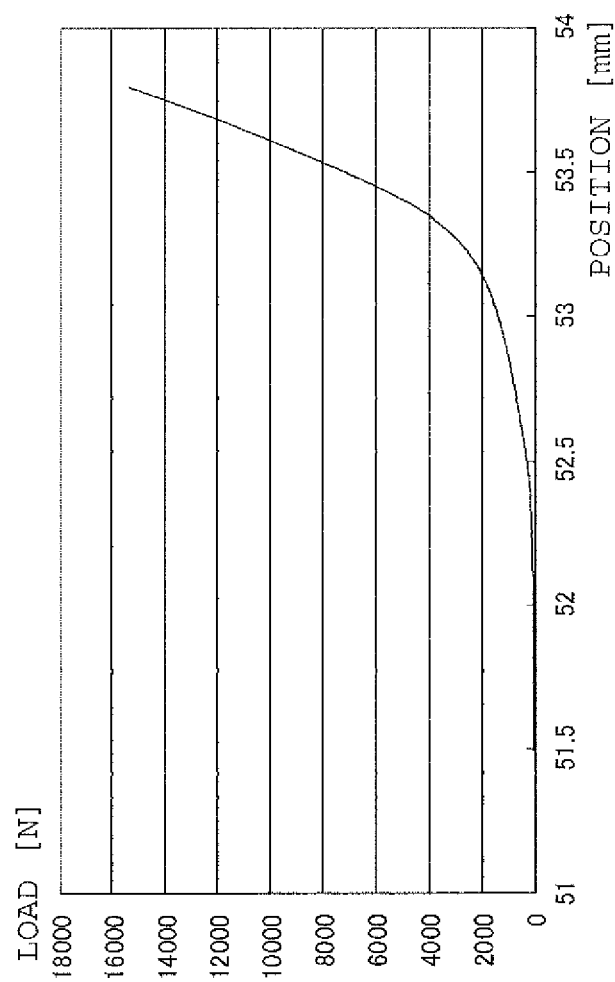
FIG. 11 is an overall view of FIG. 10.

The reduction in speed unit that the moved distance per time is reduced. In a case in which the amount of change of the load per unit moved-distance is to be calculated, if the moved distance corresponding to the denominator thereof is small, the amount of change of the load is correspondingly reduced, and a phenomenon that the values calculated as a result (degrees of slope) are varied occurs. For example, FIG. 10 shows a graph of position/load of a case in which the speed is varied. FIG. 11 is an overall position/load graph, part of which (near a position of 52.7 mm slightly after contact with the work) enlarged in a lateral direction is FIG. 10. Data points are represented by ◆, and, since the data is obtained at a constant time interval, reduction in the interval of ◆unit that the moved distance per unit time is short, in other words, the speed is reduced. The density thereof is extremely high, in other words, the speed is low near a position of 52.77 mm.

Figure 12:
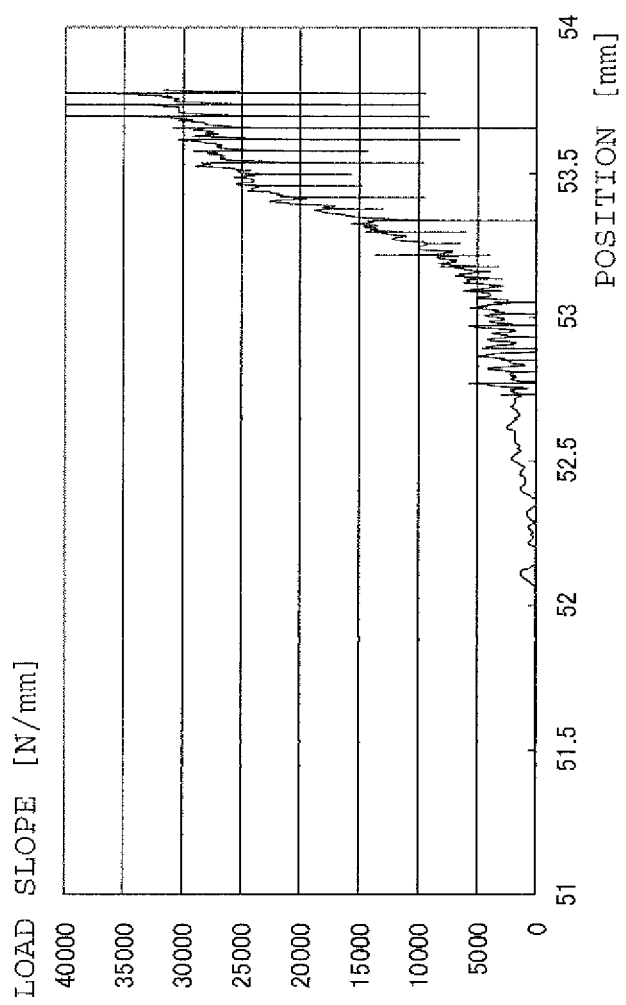
FIG. 12 is a graph of position/load-slope, wherein the slope of loads is calculated based on the data of FIG. 11.
Figure 13:
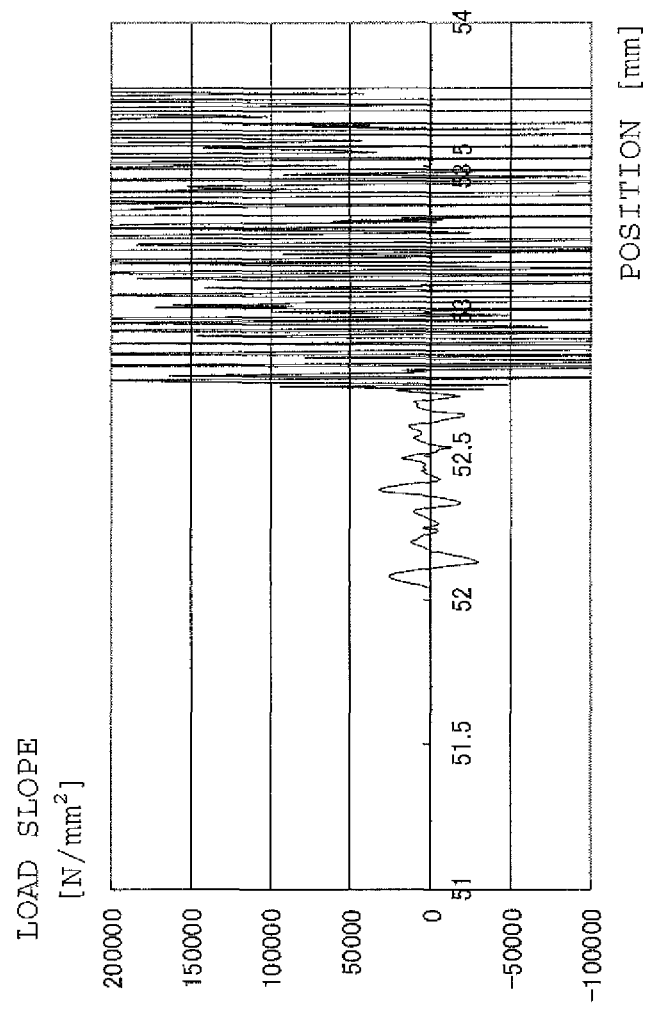
FIG. 13 is a drawing showing the results of calculating the slope of the slope based on the data of FIG. 12.
Figure 14:
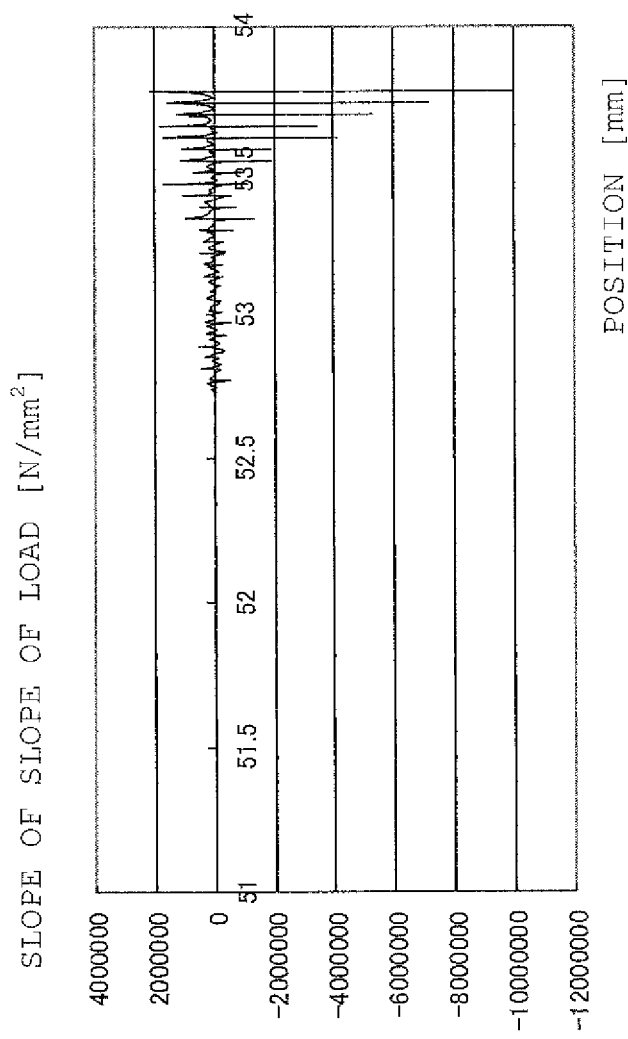
FIG. 14 is a drawing of a graph obtained by expanding the range of the vertical axis so that the entire image of the data of FIG. 13 can be viewed.

FIG. 12 shows a graph of a position/load slope obtained by calculating the slope of the load based on the data of FIG. 11. It can be understood that the values of the slope are extremely varied due to the variations in the speed. FIG. 13 shows the result of calculating the slope of the slope based on the data of FIG. 12. FIG. 14 shows a graph obtained by expanding the range of the vertical axis so that the entire image of the data of FIG. 13 can be viewed. It can be understood by viewing this that the movement of data correlated to the bend point is not observed at all and that it results in meaningless noise. In this state, the bend point cannot be detected by comparison with the reference set value.

The data shown in FIG. 11 is obtained as a result of pressurization in which the speed is intentionally reduced from the position 52.7 mm as a pressurization operation. In the calculation of obtaining the slope of FIG. 15, in principle, a load difference is divided by a position difference. The position difference corresponding to the denominator of this division is varied when the speed is varied in the original data.

Figure 15:
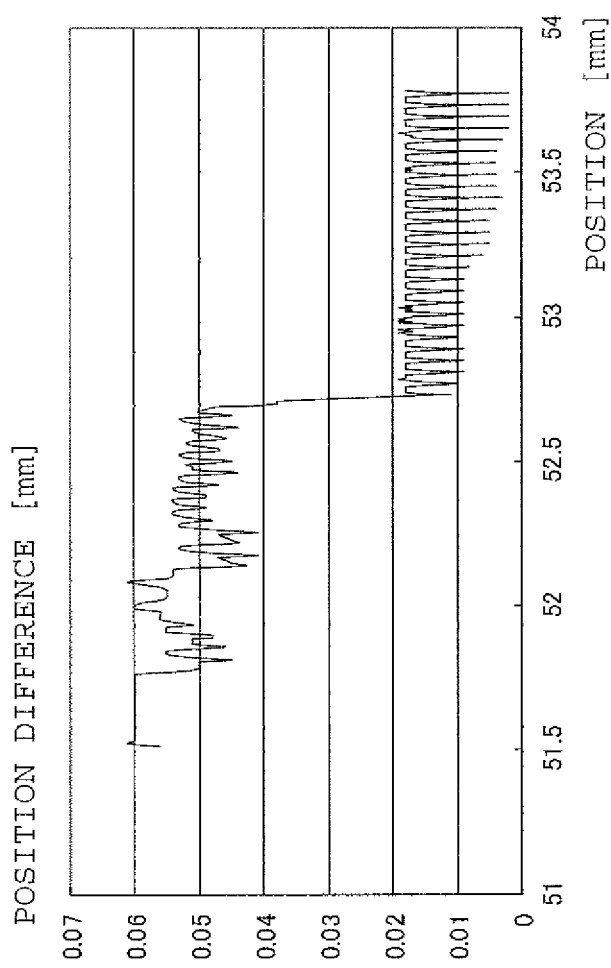
FIG. 15 is a drawing showing a position difference serving as the denominator of obtaining the slope of FIG. 11.

FIG. 15 shows a graph of the position difference serving as the denominator of obtaining the slope of FIG. 11. It can be understood that the position difference is reduced since the speed is reduced. Moreover, since there are speed variations, the difference between the positions obtained at the constant time interval is varied. Particularly, when the slope is calculated by using values close to 0, the results thereof do not become significant values.

Figure 4:
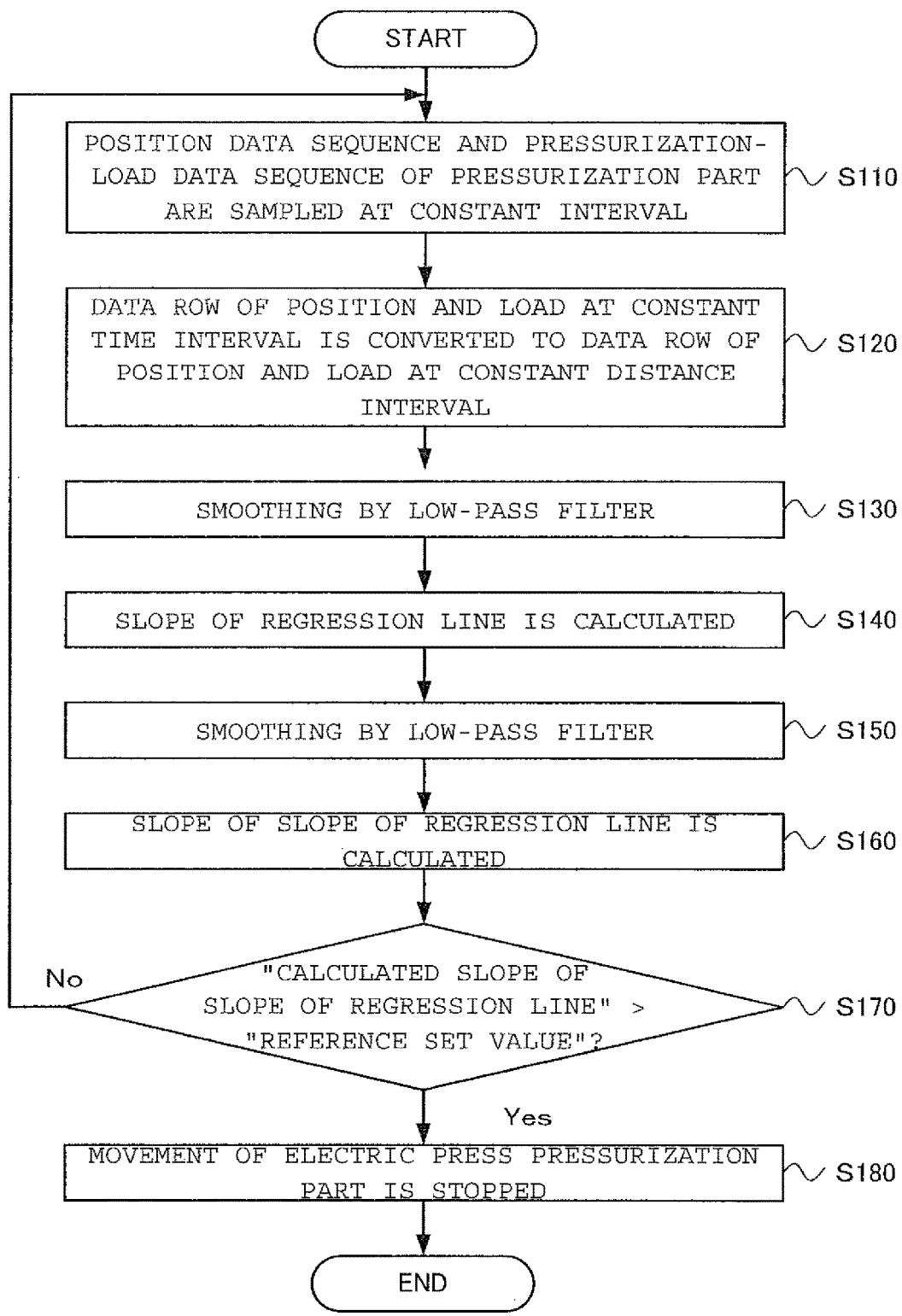
FIG. 4 is a drawing showing a process flow of the electric press in one or more embodiments of the present invention.
Figure 5:
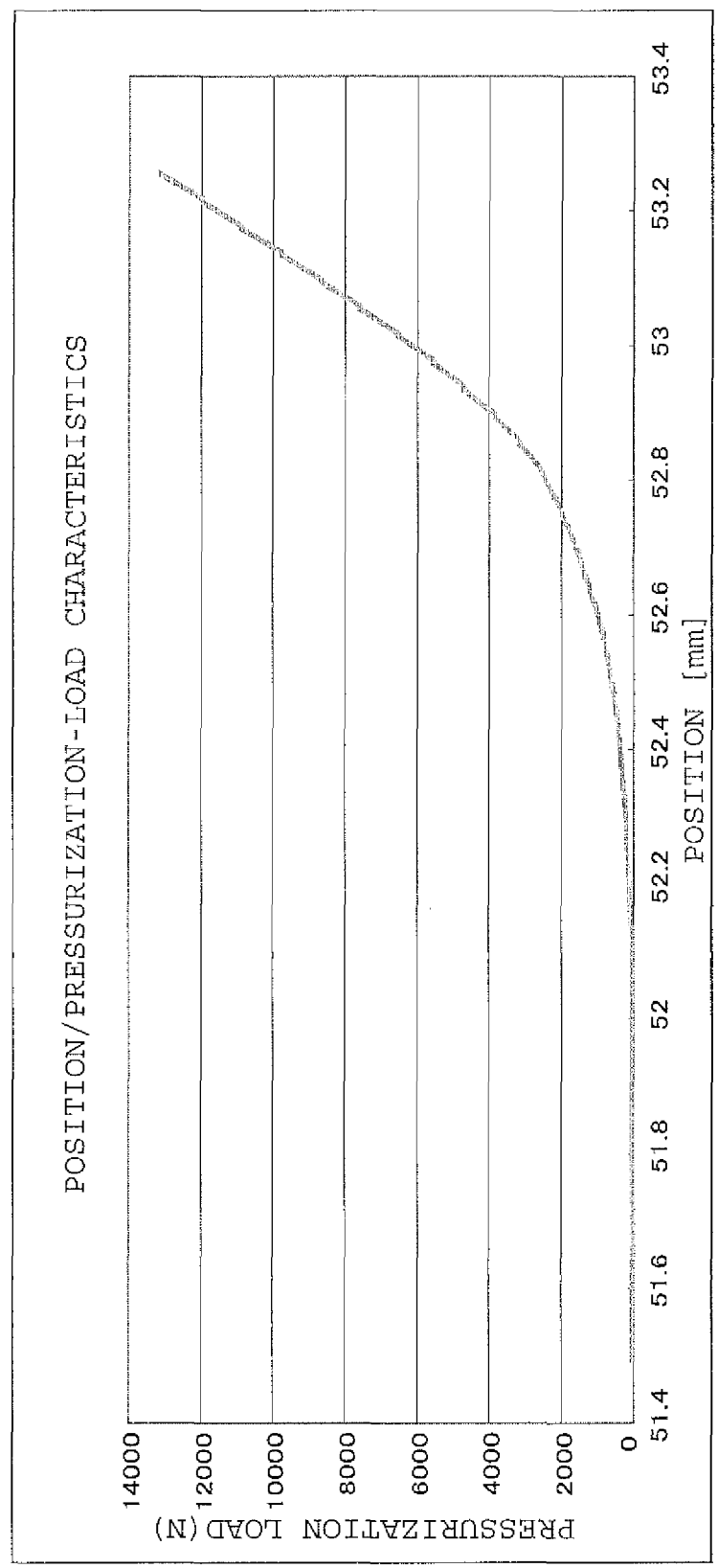
FIG. 5 is a drawing showing the relation of position/load data of the electric press in one or more embodiments of the present invention.

In order to obtain significant values also in such a case in which the speed is varied, as shown in step S120 of FIG. 4, preprocessing of replacing the position/load data of a constant time interval to the position/load data of a constant distance interval is carried out, the slope of the slope of the load is calculated based on this data, and it is compared with the reference set value, thereby detecting a bend point. Hereinafter, the process of step S120 will be explained in detail.

Figure 16:
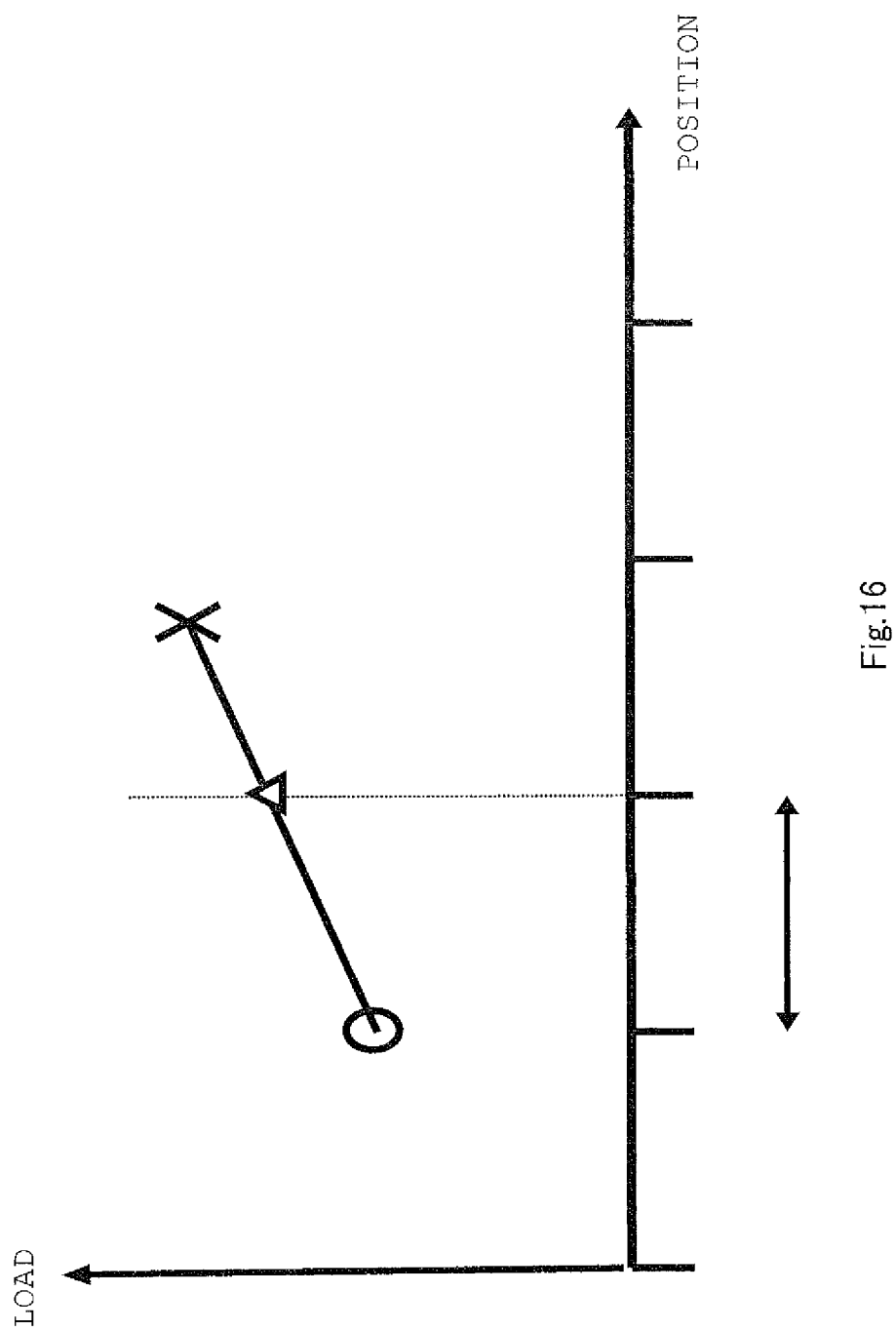
FIG. 16 is a drawing for explaining the process of step S120 in FIG. 4.

The data of position/load obtained at the constant time interval is converted to position/load data of the constant distance interval. In order to do this, sectioning data at every constant distance (dist) is considered as shown in FIG. 16. A previous position/load data set will be referred to as "previous position (forward position)" (hereinafter, this will be described as f_pos) and "previous load (forward load)" (hereinafter, this will be described as f_load). This is a point shown by O in FIG. 16.

Also, the data obtained at present time will be referred to as "present-time position (current position)" (hereinafter, this will be described as c_pos) and "present-time load (current load)" (hereinafter, this will be described as c_load). This is a point shown by X in FIG. 16. From these O and X, Δ is obtained. The load (n_load) at a position (n_pos) distant from the previous position (f_pos) by the constant distance (dist) is obtained by interpolation. The calculating formula thereof is Formula 3.

$$\text{Load}(n\_load) = f\_load + (c\_load - f\_load) * \text{dist} / (c\_pos - f\_pos)$$

$$\text{Position}(n\_pos) = f\_pos + \text{dist} \qquad \text{[Formula 3]}$$

Figure 17:
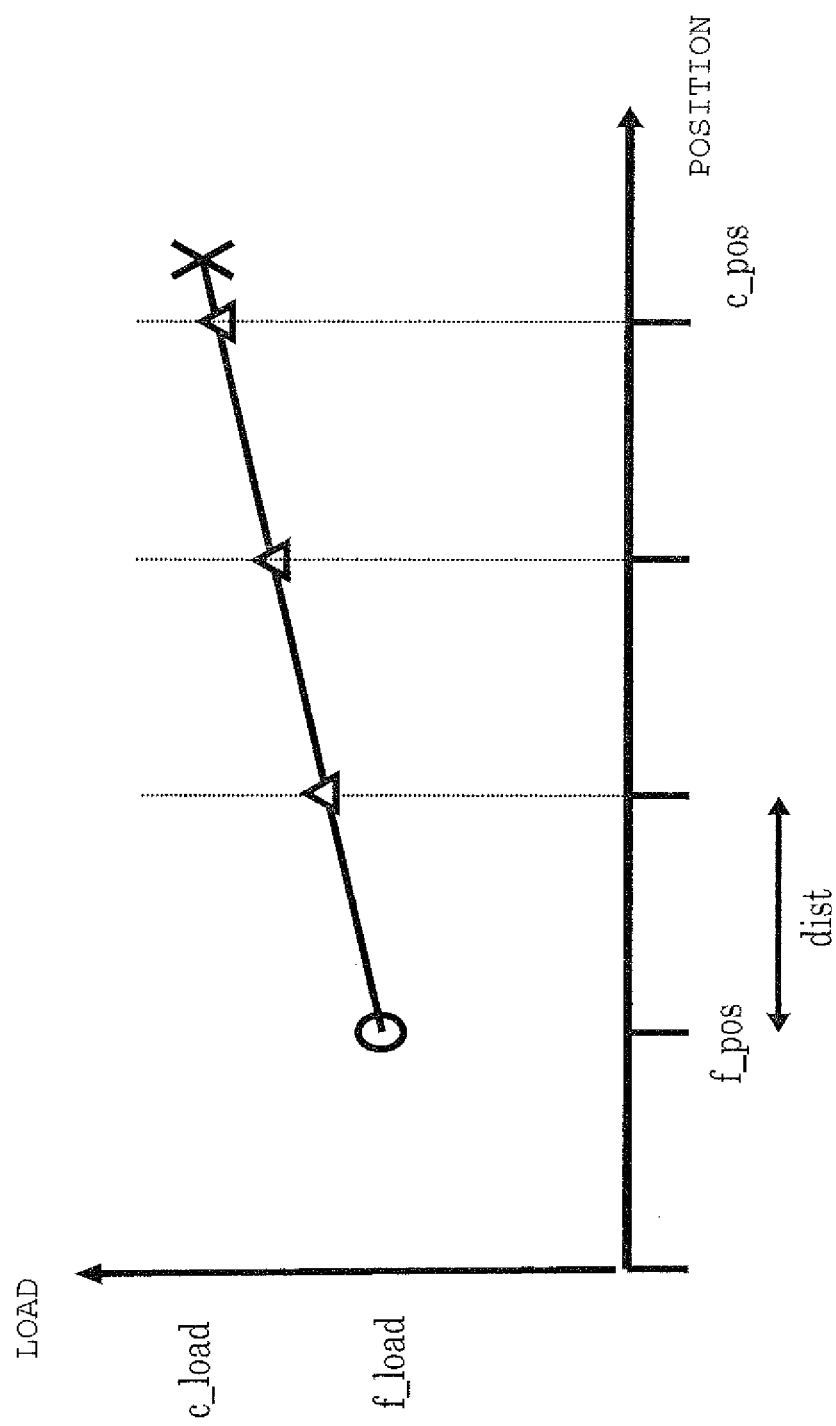
FIG. 17 is a drawing for explaining the process of step S120 in FIG. 4.

In practice, at the point X of the present time, if the positions are rapidly increased and exceed the equal interval by two or more sections as shown in FIG. 17, the calculation of the first point may be the same, but this has to be repeated to create the point(s) therebetween. Reversely, if the point X of the present time is not distant by the constant distance (dist), this point is ignored or a regression line is calculated by two or more points including this point to obtain the point of Δ as a point on the straight line thereof.

As explained above, according to the present embodiment, the slope of the slope of the load can be calculated as significant values, and the bend point can be detected based on that.

Figure 18:
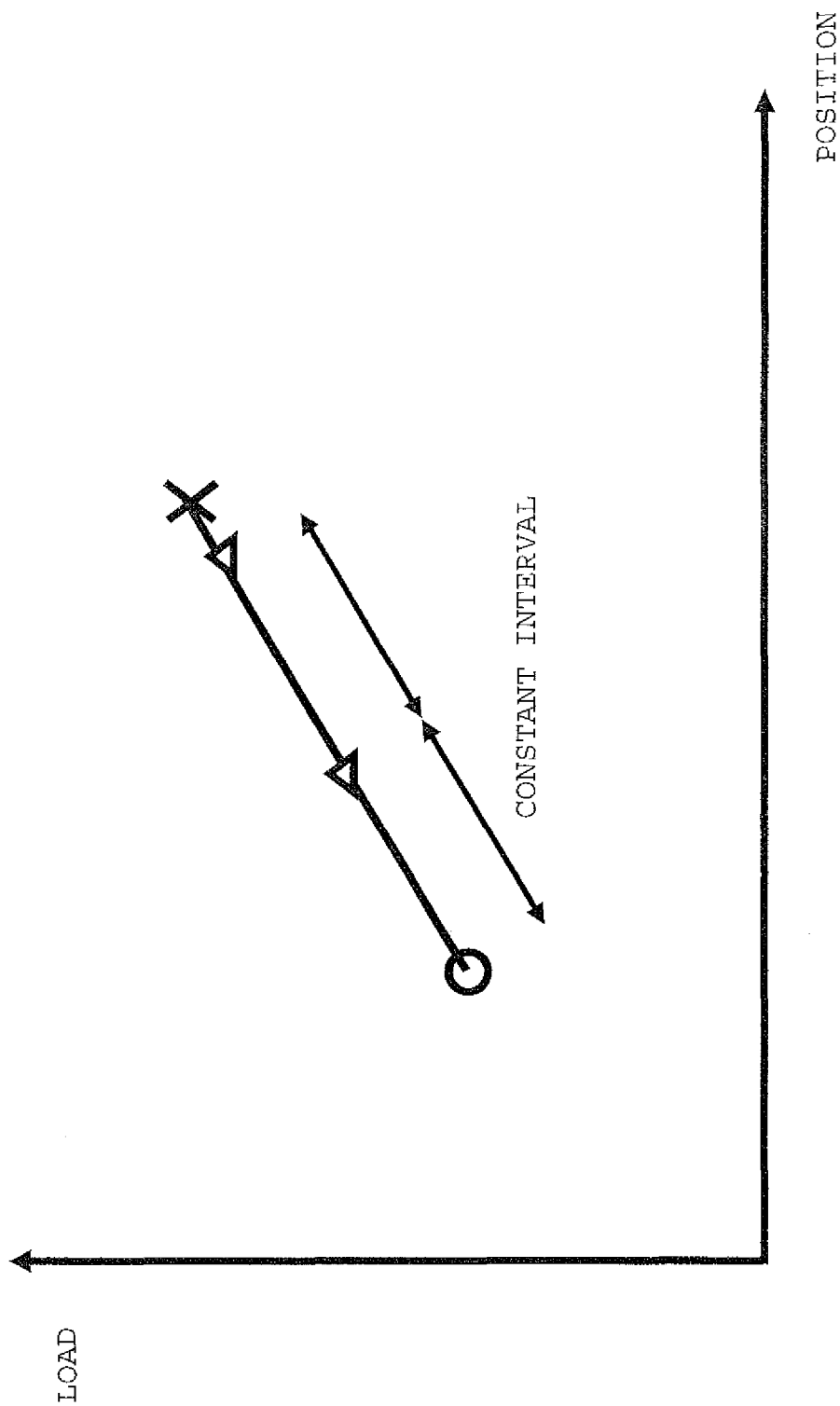
FIG. 18 is a drawing showing a method of sectioning by "constant interval" in position/load space according to a second embodiment of the present invention.

Note that, as shown in FIG. 18 to FIG. 23, another method may be used. Specifically, instead of sectioning by a constant distance (dist), sectioning by "constant interval" in position/load space is carried out (FIG. 18). Hereinafter, details of this process will be explained.

In this case, the distance D=|Pc−Pf| from "previous point (Pf)" O to "present-time point (Pc)" X in the position/load space is considered, and sectioning that by the "constant distance" (Dc) determined in advance is considered. The load and the position of a section point is obtained by Formula 4.

$$D^2 = (c\_load - f\_load)^2 + (c\_pos - f\_pos)^2$$

$$\text{Load}(n\_load) = f\_load + (c\_load - f\_load) * Dc/D$$

$$\text{Position}(n\_pos) = f\_pos + (c\_pos - f\_pos) * Dc/D \qquad \text{[Formula 4]}$$

Figure 19:
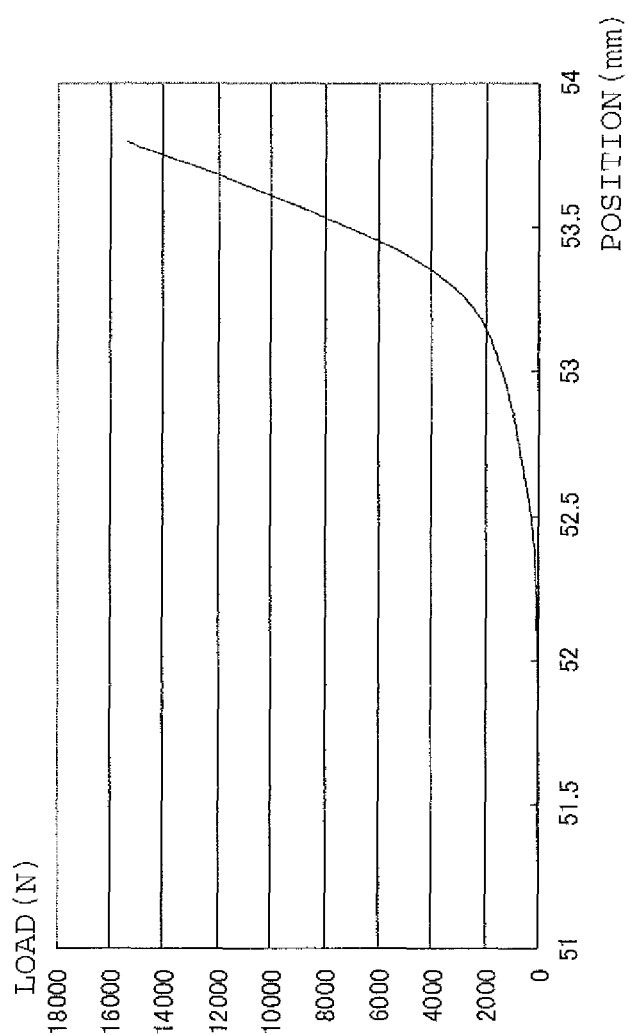
FIG. 19 is a graph of position/load, wherein preprocessing by a constant distance interval has been carried out.
Figure 20:
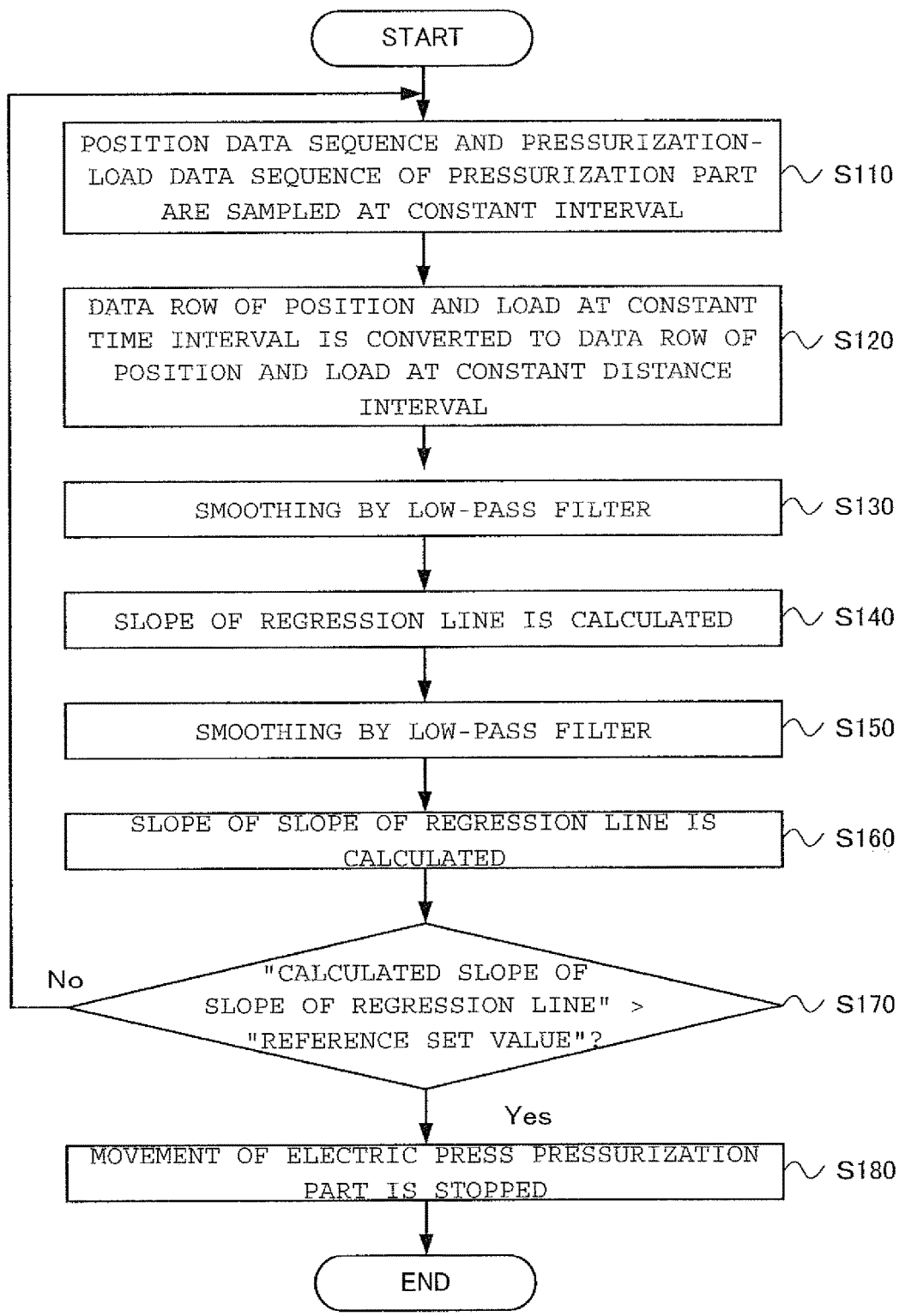
FIG. 20 is a drawing showing a process flow of an electric press.
Figure 21:
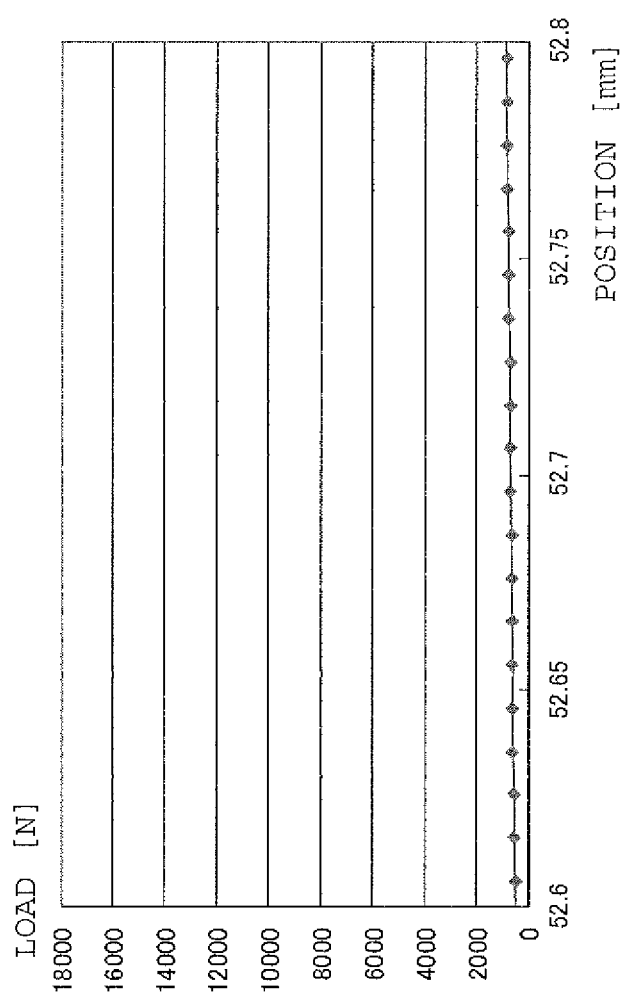
FIG. 21 is a drawing which enlarges part of a graph of position/load, wherein preprocessing has been carried out by the constant distance interval.
Figure 22:
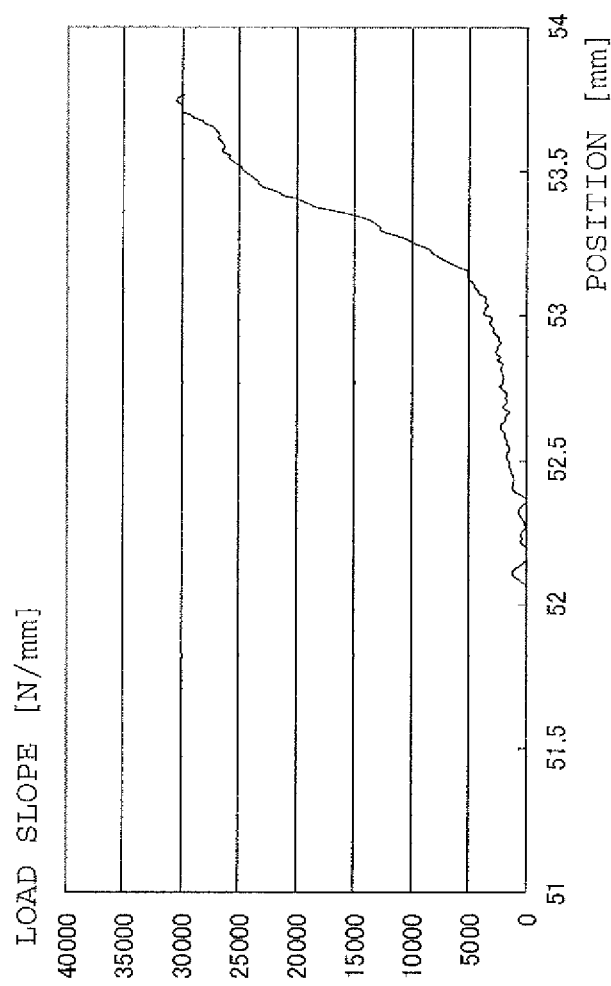
FIG. 22 is a graph of the slope of position/load based on data which has undergone preprocessing by the constant distance interval.
Figure 23:
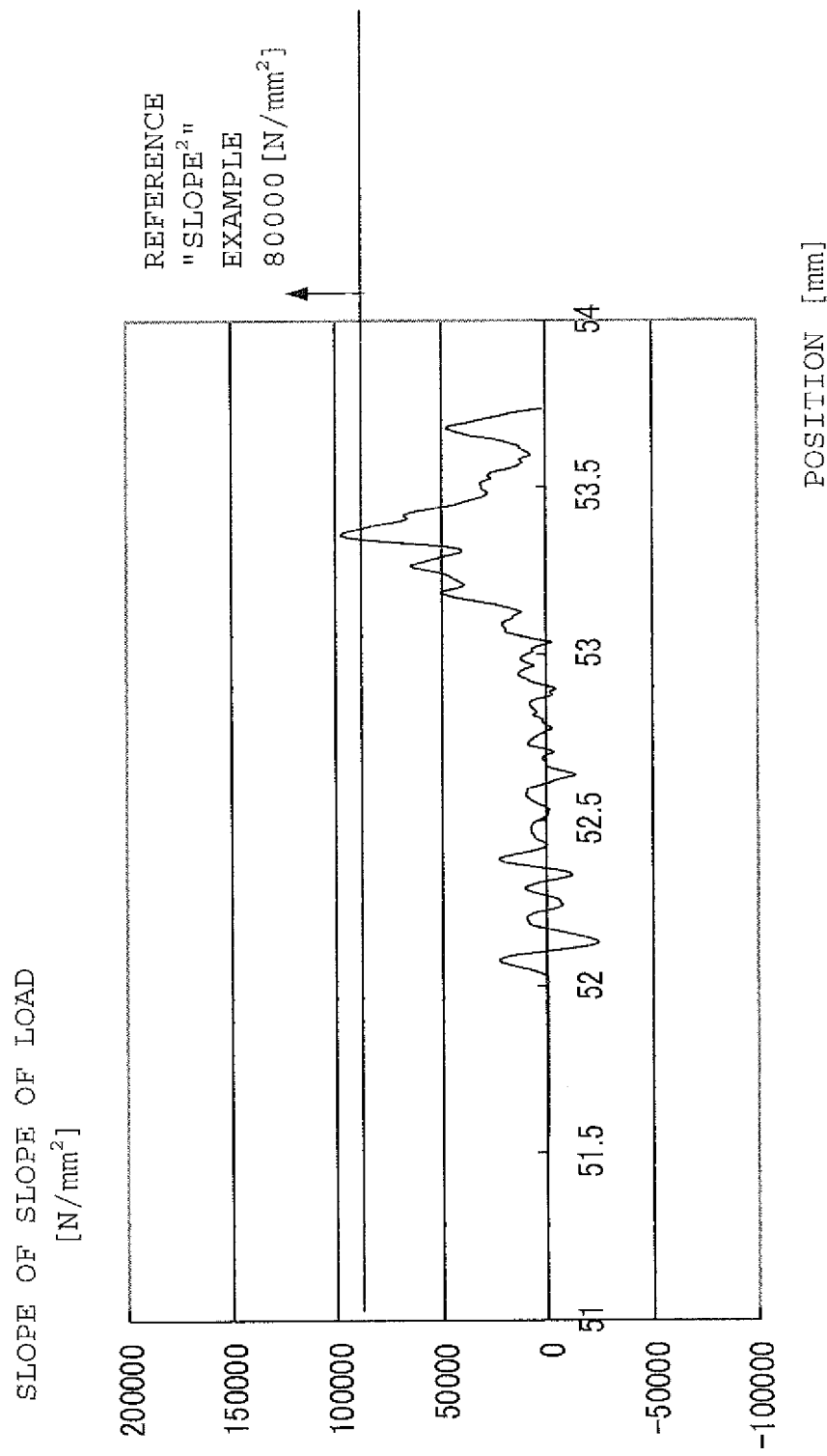
FIG. 23 is a graph of the slope of the slope of position/load based on the data which has undergone preprocessing by the constant distance interval.

Such preprocessing will be explained by a graph of results of carrying out that. FIG. 19 is a position/load graph which replaces the position/load graph of FIG. 11 without preprocessing with the position/load of the constant distance interval by the process of S121 of FIG. 20. As long as it is viewed from the graph of "position/load", any difference caused by the presence/absence of the preprocessing is not present (not observed). FIG. 21 shows the result of subjecting the part the same as that shown in FIG. 10 to the preprocessing of obtaining the constant distance interval of step S121 of FIG. 20. It can be understood by viewing this that FIG. 10 and FIG. 21 are different from each other. In FIG. 10, it can be understood that the intervals of the data are varied, while FIG. 21 has the data of the constant distance interval. FIG. 22 shows the results of obtaining the slope of the load of the data of FIG. 19 which has undergone the preprocessing of obtaining the constant distance interval of step S121 of FIG. 20. FIG. 22 does not have the variations which are observed in FIG. 12. When the slope of the slope of FIG. 22 based on the data of preprocessing with the constant distance interval is obtained, although variations are somewhat observed as shown in FIG. 23, it can be understood that significant data having a peak near a bend point is obtained. Herein, for example, if 80000 [N/mm²] is set as a reference value "slope of slope", a determination of stopping, etc. at a point that exceeds this reference value as shown in FIG. 23 can be made.

When factors caused by the speed variations are removed by the preprocessing in this manner, significant values of the slope of the slope of the load can be obtained.

In the above described embodiment, the method in which data is sectioned by a constant distance is mentioned in order to remove variation factors. However, a method in which a block length for calculating the slope (a smoothing process such as obtaining a moving average is carried out while using two or more pieces of data as a block, or a slope calculation per se is calculated from the data of two or more blocks) is changed in accordance with a position difference (if the position difference is small, the block length is increased) is also an essentially similar process, and similar effects can be obtained.

Figure 24:
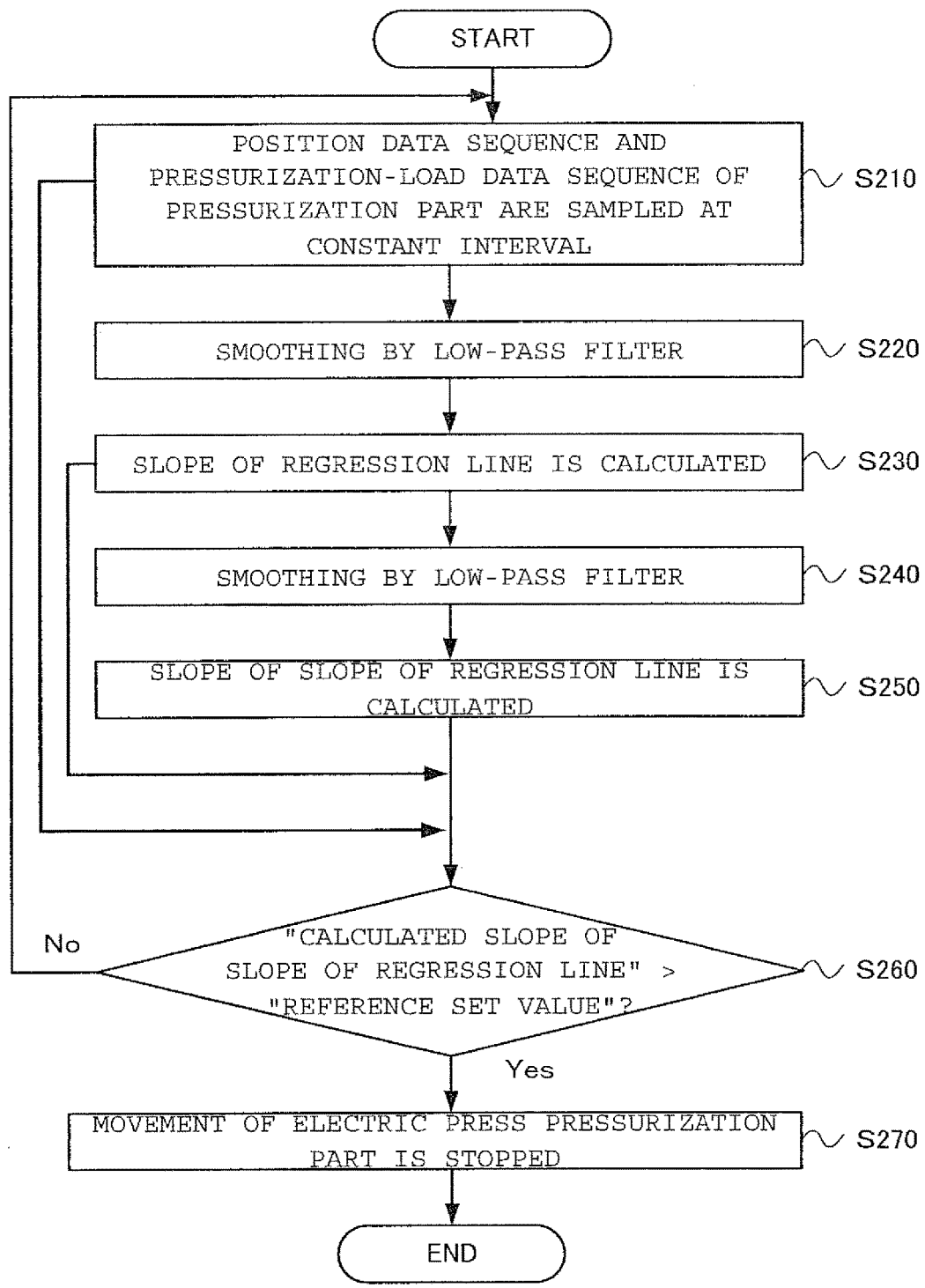
FIG. 24 is a drawing showing a process flow of en electric press.

As a unit for solving the problem that, when the amounts of changes (slope) are calculated, significant values are not obtained due to variations, a processing method which is used in combination with another or the above described method will be described below. FIG. 24 shows a process flow. In step S210 of FIG. 24, a pressurization position and a pressurization load are obtained, and, based on that, the slope of the load is calculated in step S230. The slope of the slope of the load is calculated from the slope of the load in step S250). In the above process, the above described slope calculation by the regression line or the preprocessing of conversion to the constant distance interval may be carried out. In step S260 of FIG. 24, reference values are set not only for "the slope of the slope of the load" but also for "load value" and "slope value of the load value". These are compared with the "load value", "slope value of the load", and "slope value of the slope of the load" obtained in step S210, step S230, and step S250, and the pressurization part is stopped at a position where the calculated values exceed the reference values (step S270).

Figure 25:
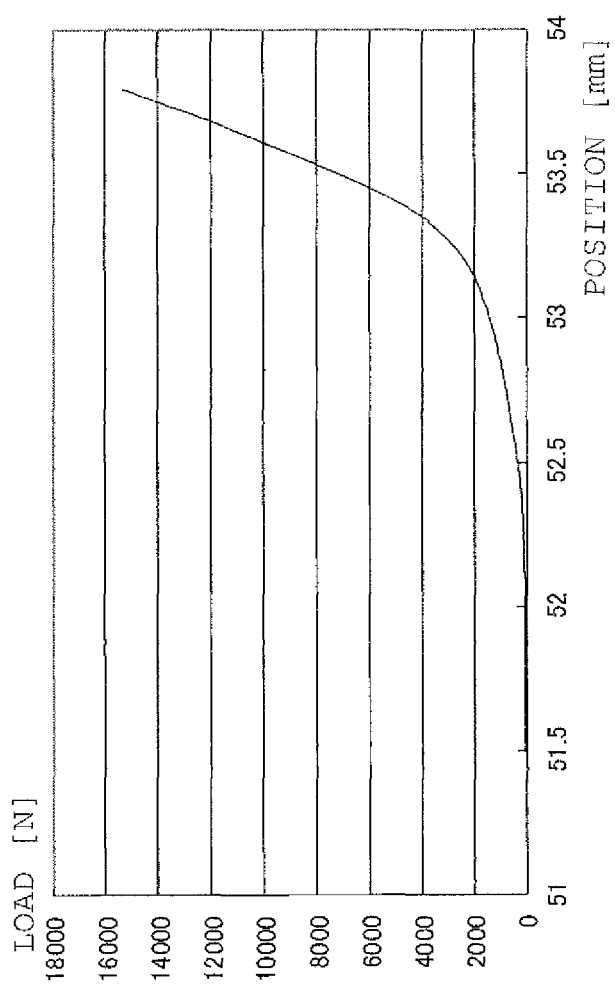
FIG. 25 is a graph of position and load.
Figure 26:
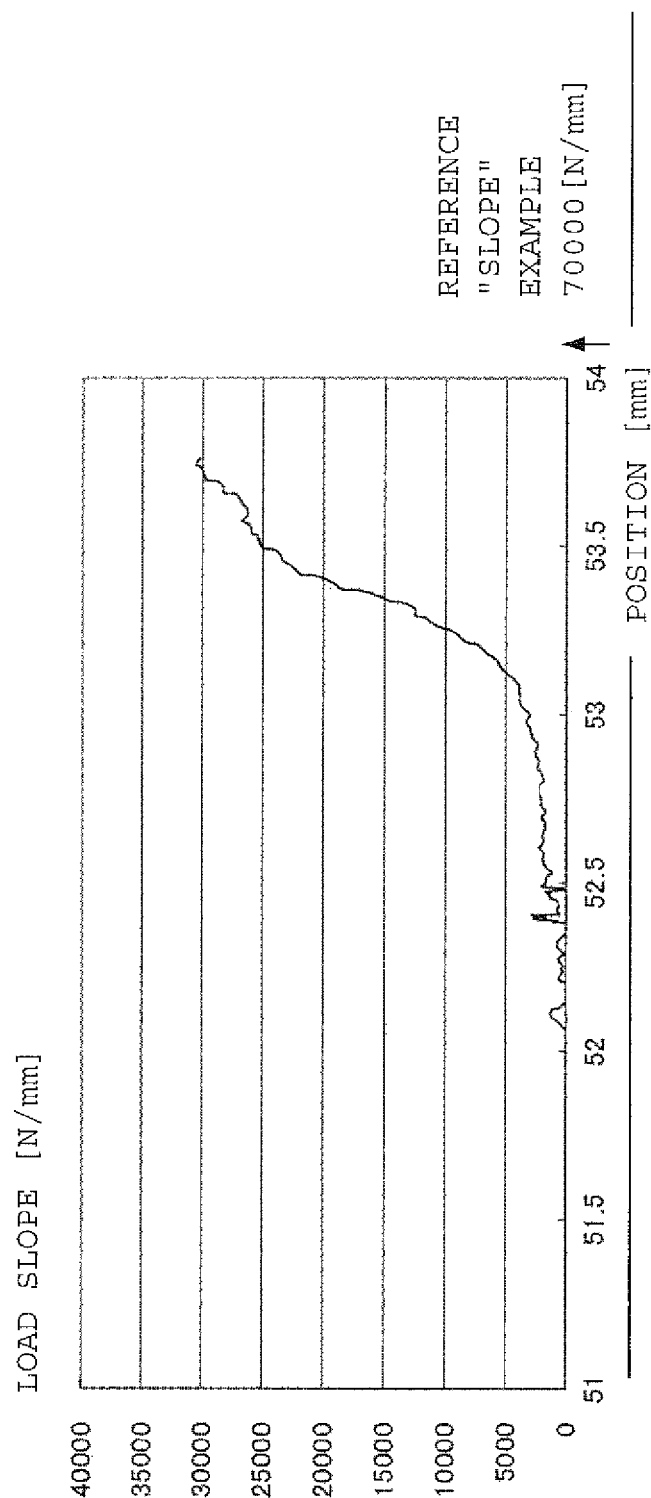
FIG. 26 is a graph in which the slope of the load is calculated from the graph of FIG. 25.

Herein, a graph of the positions and the loads is shown in FIG. 25. A graph of calculating the slope thereof is shown in FIG. 26. Although it is not clear in FIG. 25, when the slope is calculated, the values of the slope are varied due to the influence of local variations. In FIG. 26, immediately after contact with a working object, near the positions of 52.4 mm to 52.5 mm, a load slope is considerably varied by the influence of local load variations and speed variations. As a matter of course, the values are sufficiently significant although there are variations.

Figure 27:
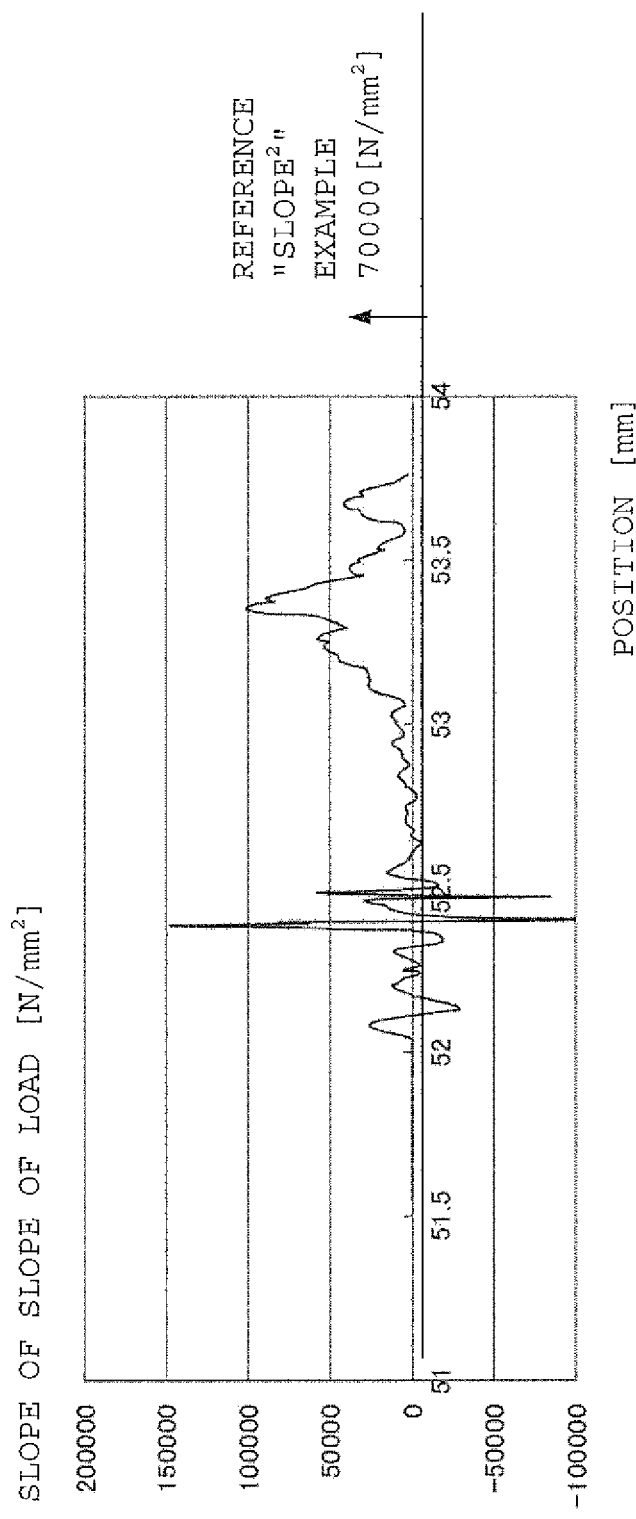
FIG. 27 is a graph in which the slope of the slope of the load is calculated based on the data of the slope of the load of FIG. 26.

FIG. 27 shows, by a graph, the result of obtaining the slope of the slope of the load based on the slope data of the load of FIG. 26. As is clear from FIG. 27, the variations immediately after contact with the working object have become obvious as a result of obtaining the slope twice. On the other hand, a peak near 53.4 mm is the bend point which has been originally desired to be obtained.

For example, the reference value of the slope of the slope is assumed to be 70000 [N/mm$^2$]. It is assumed that this value is determined since the original bend point exceeds this value. However, in this example, near a position of 52.4, this reference value 70000 [N/mm$^2$] is exceeded. Thus, in this case, if "the slope value of the slope of the load" is used as a reference to make a determination, an erroneous determination is made. In other words, it is not possible to "conclude the point at which the slope of the slope of the load exceeds the reference set value as the bend point". On the other hand, in the method provided in the present invention, for example, the reference values are set in a manner shown in Table 3.

TABLE 3

| No | Item | Value | Unit |
|---|---|---|---|
| 1 | Reference "Load Value" | 2000 | [N] |
| 2 | Reference "Load Slope Value" | 7000 | [N/mm] |
| 3 | Reference "Value of Slope of Slope of Load" | 70000 | [N/mm$^2$] |

Figure 28:
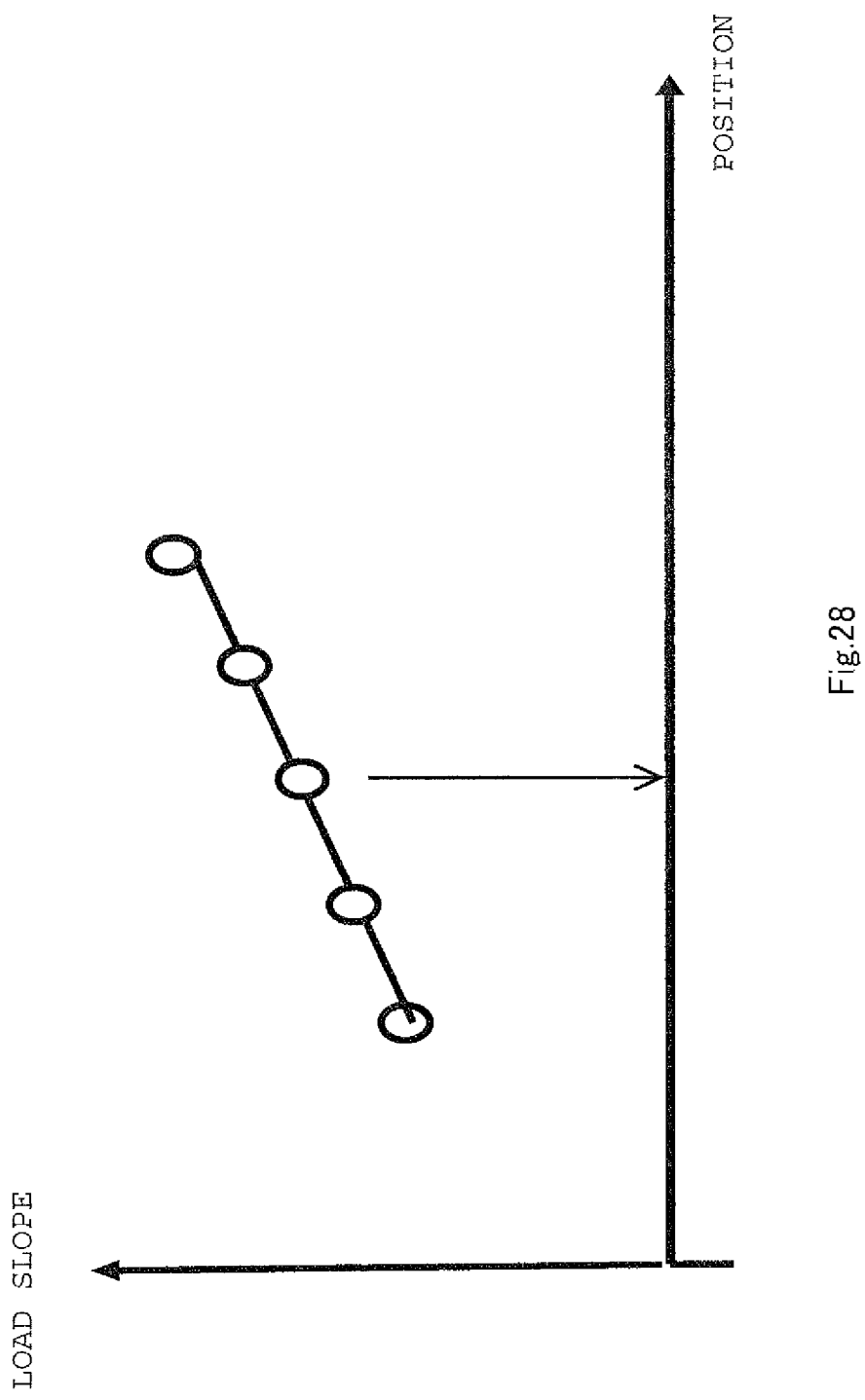
FIG. 28 shows a relation between the slope of the load and the position.
Figure 29:
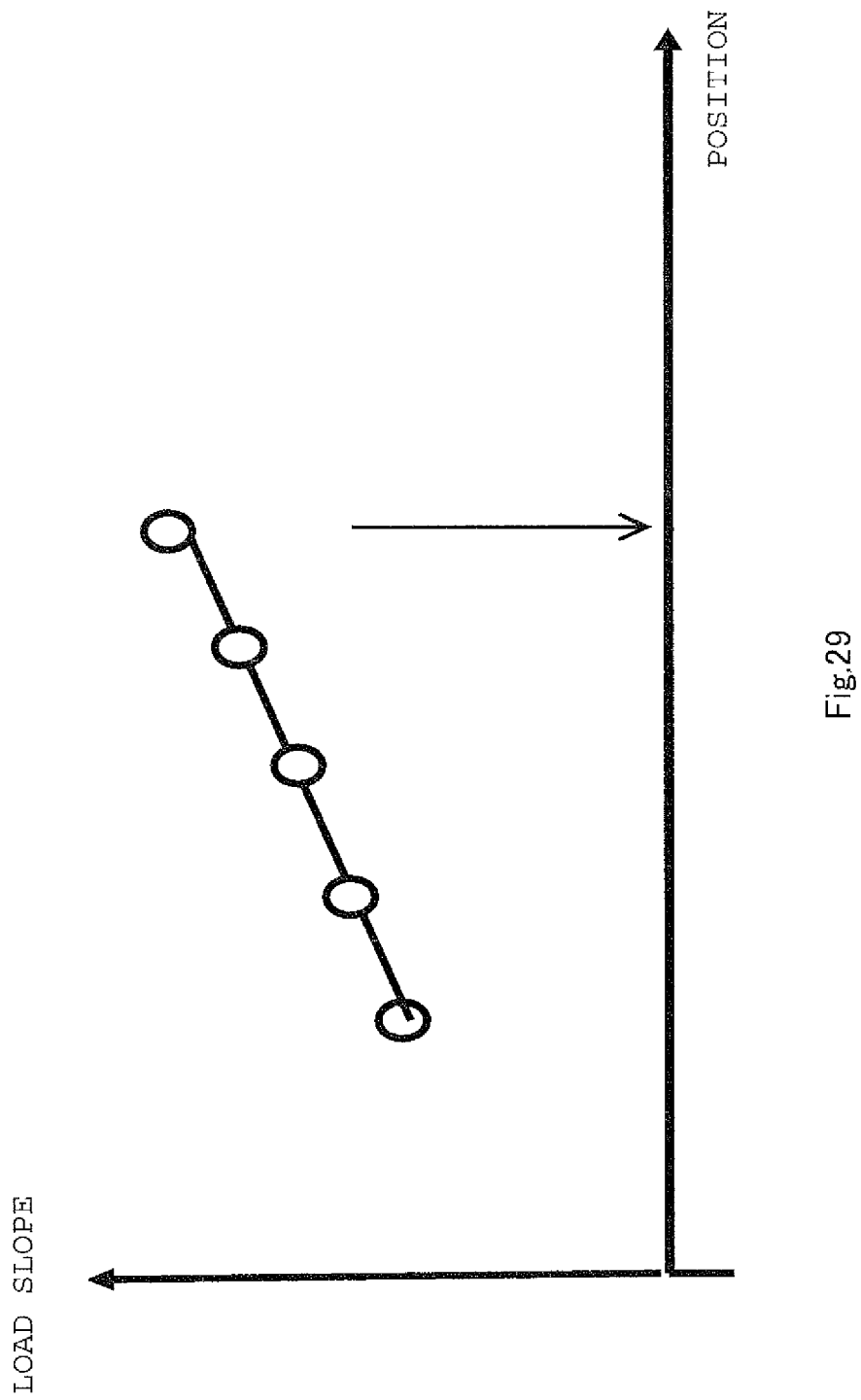
FIG. 29 shows a relation between the slope of the load and the position.
Figure 30:
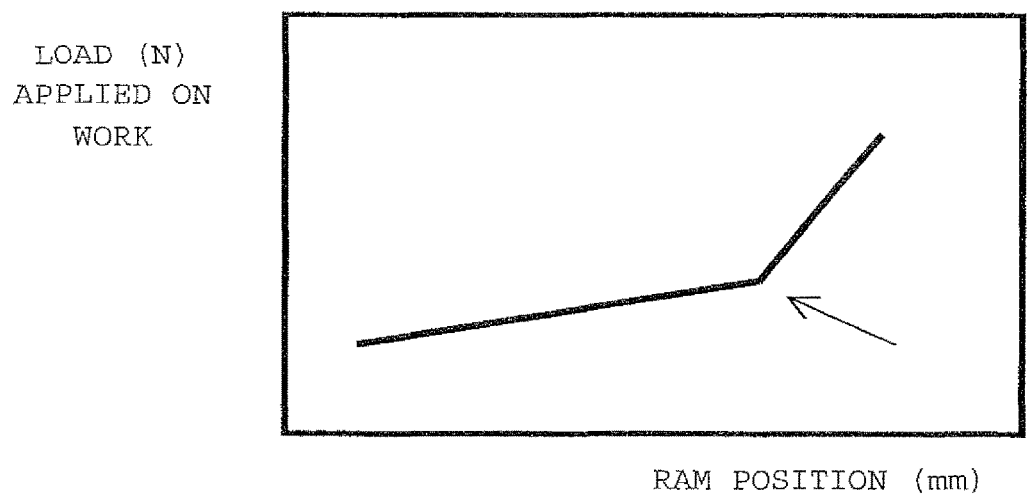
FIG. 30 is a drawing showing a bend point.
Figure 31:
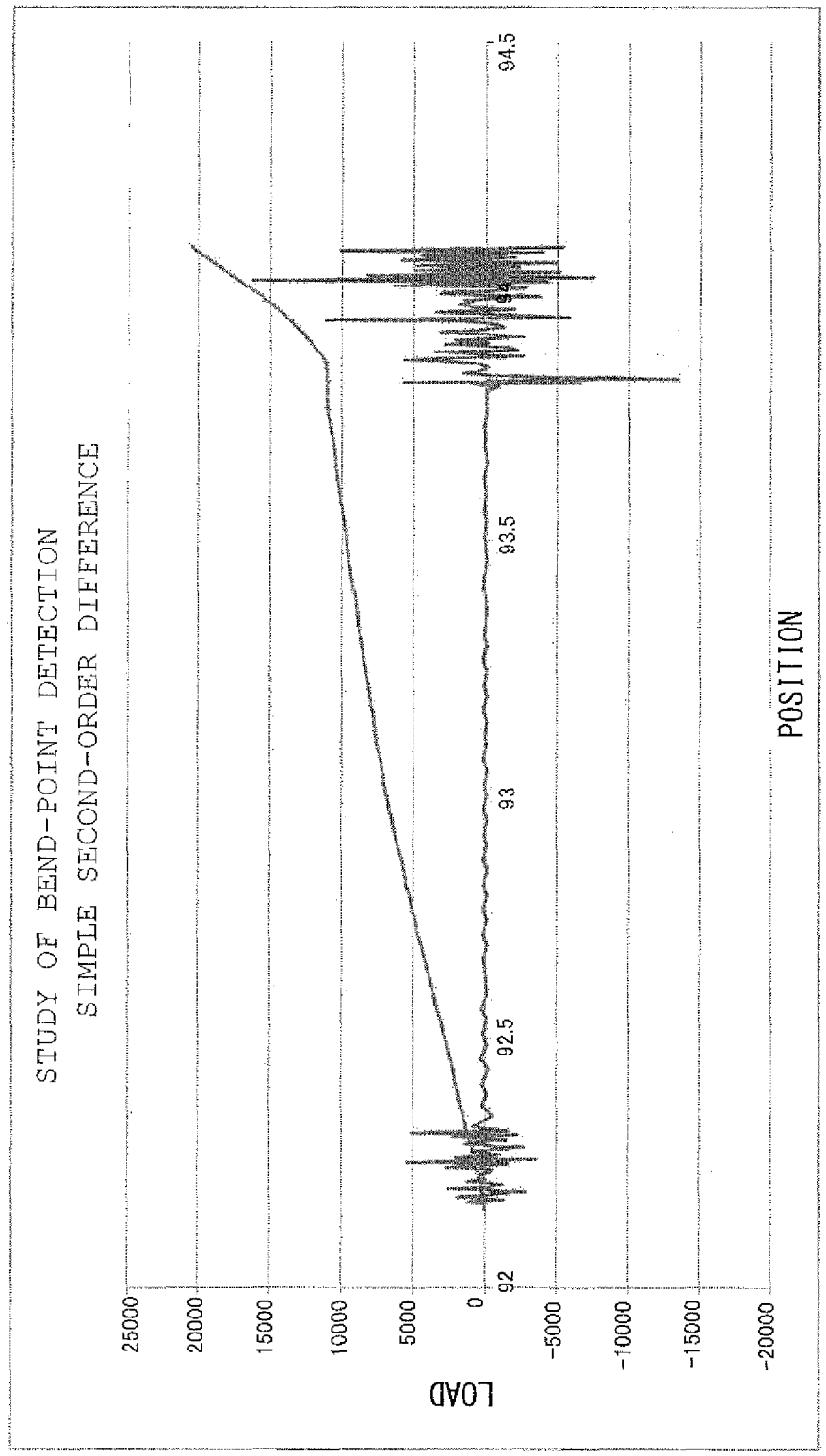
FIG. 31 is an example that draws a position/simple-second-order difference graph based on actual data of press-fitting.

When a stop determination is configured to be made by the comparison with these three values, stop can be carried out at a point exceeding the vicinity of 53.4 mm which is a correct bend point. Examples of the above described reference values are shown in FIG. 26, FIG. 27, and FIG. 28. Note that, in setting of such reference values, the values are stored in the reference-value storage device 15 by using the display device 12 and the manipulation device 13 in advance.

The values have to be determined before such reference set values are actually input/stored. The determination partially depends on a theoretical discussion; however, an operation of actually pressurizing the work is carried out, "position/load data row", "data row of slope of position/load", and "data row of slope of slope of position/load" are retrieved from the press apparatus, and the reference set values are determined based on this data.

Therefore, the press apparatus subordinately requires a function to output the "data row of position/load", "data low of slope of position/load", and "data row of slope of slope of position/load".

Hereinabove, in FIG. 4, FIG. 20, and FIG. 24, "movement of the pressurization part of the electro press (electric press) is stopped" as a result of the comparison with the reference set value. However, no limitation is imposed by this, for example, there are ways of use such as: pass/not-pass judgement whether the position of the detected bend point (the point of exceed by the comparison) is within the range of judge values (lower limit value, upper limit value) set in advance, judgement of the load value of the detected bend point, stop after forward movement by a set distance from the detected bend point, or pass/not-pass judgement of the distance from the detected bend point to a stopped position (stop in this case is carried out by a some sort of different reference).

In a strict sense, there are two cases including a case in which, as the position of the bend point, the data before and after the position can be referenced (a case in which it is only required to calculate the position thereafter) and a case in which the data after the position cannot be referenced (a case in which an action such as stop has to be carried out at the point of time of detection). In FIG. 28, for example, the slope of the slope is calculated from five data points (in the drawing, shown by O), and, since the value thereof exceeds the reference, it can be conceived that the position of a bend point is the position of the third point which is at the center of the five points (shown by an arrow of FIG. 28). On the other hand, in FIG. 29, the fifth point has been just obtained at the present point, the slope of the slope is calculated, and for example a determination is made to carry out stop at this point since the value thereof has exceeded the reference; in this case, the position thereof is at the fifth position of the present point as shown by an arrow of FIG. 29. As shown in FIG. 28, in a situation in which the data before and after the position can be referenced, when the slope is obtained twice, it is reasonable to determine the center position thereof as the position of the bend point as much as possible. In a case such as pass/not-pass judgement of the bend position in which the calculation thereafter is only required, such a consideration is also required.

As described above, the regression line by the least-square method shown by Formula 1 was conceived, and the slope thereof was used. However, no particular limitation is imposed by this, and it is also conceivable to calculate a regression line using a standard deviation, more specifically the slope of the regression line as the value obtained by dividing the standard deviation of Y by the standard deviation of X.

Note that the electric press of one or more embodiments of the invention can be realized by recording the process of the electric press in a recording medium, which can be read by a computer system and causing the electric press to read and execute the program recorded in the recording medium. The computer system referred to herein includes an OS and hardware such as peripheral devices.

If a WWW (World Wide Web) system is utilized, the "computer system" also includes a homepage providing environment (or display environment). The above described program may be transmitted from the computer system, which stores the program in a storage device or the like, to another computer system via a transmission medium or by transmission waves in the transmission medium. Herein, the "transmission medium", which transmits the program, refers to a medium having a function to transmit information like a network (communication network) such as the Internet or a communication line (communication wire) such as a telephone line.

The above described program may be a program for realizing part of the above described functions. Furthermore, the above described program may be a so-called difference file (difference program), which can realize the above described functions by combination with a program(s) already recorded in the computer system.

Hereinabove, the embodiments of this invention have been described in detail with reference to drawings. However, specific configurations thereof are not limited to the embodiments, but include designs, etc. within a range not departing from the gist of this invention.

DESCRIPTION OF REFERENCE NUMERALS

1; RAM
2; BALL SCREW
3; ELECTRIC MOTOR
4; CASING
1a; TUBULAR MAIN BODY
2a; SCREW SHAFT
2b; NUT BODY
1b; PRESSING BODY
5; TUBULAR GUIDE
6; ANTI-VIBRATION GUIDE
6a; ANTI-VIBRATION ROD
6b; GUIDING PART
6c; COUPLING PLATE
7; COLUMN
8; BASE
9a; MANIPULATION BUTTON
9b; MANIPULATION BUTTON
10; CONTROL UNIT
11; CONTROL-PROGRAM STORAGE DEVICE
12; DISPLAY DEVICE
13; MANIPULATION DEVICE
14; TEMPORARY STORAGE DEVICE
15; REFERENCE-VALUE STORAGE DEVICE
16; LOW-PASS FILTER
20; CENTRAL PROCESSING UNIT (CPU)
21; MOTOR-DRIVE CONTROL DEVICE
22; ENCODER

The invention claimed is:

1. An electric press comprising:
a detection unit configured to detect a first data row of a press position at a constant time interval and a load at the press position at the constant time interval;
an input and storage unit configured to input and store a load value, a value of a slope of the load, a value of a slope of the slope of the load serving as references for determining stop or judge;
a data-row calculation unit configured to calculate a second data row of the press position and the load at a constant distance interval based on the first data row of the press position and the load detected at the constant time interval;
a slope calculation unit configured to calculate the value of the slope of the load based on the second data row of the press position and the load at the press position at the constant distance interval, according to a first regression line, wherein the slope of the load is calculated by the following formula (i), $$\text{the slope of the load} = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2}; \quad [\text{Formula (i)}]$$

a slope-of-slope calculation unit configured to calculate the value of the slope of the slope of the load as an amount of change of an amount of change of a load value with respect to the press position by using the formula (i) for calculating a slope of the first regression line, according to a second regression line,
wherein, in the formula (i), n denotes a number of data, xi denotes data of a pressurization part, and yi denotes data of a load; and
a determination unit configured to compare the calculated value of the slope of the slope of the load with values serving as references to determine stop or judge.

2. The electric press according to claim 1,
wherein the slope calculation unit and the slope-of-slope calculation unit smooth the second data row of the press position and the load at the press position at the constant distance interval, and calculate the value of the slope of the load and the value of the slope of the slope of the load based on the press position and the load at the press position smoothed at the constant distance interval.

3. An electric press comprising:
a detection unit configured to detect a first data row of a press position at a constant time interval and a load at the press position at the constant time interval;
an input and storage unit configured to input and store a load value, a value of a slope of the load, a value of a slope of the slope of the load serving as references for determining stop or judge;
a data-row calculation unit configured to calculate a second data row of the press position and the load at a constant distance interval in space of the load, based on the first data row of the press position and the load at the constant time interval;

a slope calculation unit configured to calculate the value of the slope of the load based on the second data row of the press position and the load at the press position at the constant distance interval, according to a first regression line, wherein the slope of the load is calculated by the following formula (i), $$\text{the slope of the load} = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2};  \quad \text{[Formula (i)]}$$

a slope-of-slope calculation unit configured to calculate the value of the slope of the slope of the load as an amount of change of an amount of change of a load value with respect to the press position by using the formula (i) for calculating a slope of the first regression line, according to a second regression line, wherein, in the formula (i), n denotes a number of data, xi denotes data of a pressurization part, and yi denotes data of a load; and a determination unit configured to the calculated value of the slope of the slope of the load with the values serving as the references to determine stop or judge.

4. The electric press according to claim 3, wherein the slope calculation unit and the slope-of-slope calculation unit smooth the press position and the load at the press position at the constant distance interval in the space of the load and calculate the value of the slope of the load and the value of the slope of the slope of the load based on the press position and the load at the press position smoothed at the constant distance interval in the space of the load.

5. A bend-point detection method of an electric press comprising at least a detection unit, an input and storage unit, a data-row calculation unit, a slope calculation unit, a slope-of-slope calculation unit, and a determination unit; the method including:

a first step of detecting a first data row of a press position at a constant time interval and a load at the press position at the constant time interval by the detection unit;

a second step of inputting and storing a load value, a value of a slope of the load, a value of a slope of the slope of the load serving as references for determining stop or judge by the input and storage unit;

a third step of calculating a second data row of the press position and the load at a constant distance interval based on the first data row of the press position and the load detected at the constant time interval;

a fourth step of calculating the value of the slope of the load based on the second data row of the press position and the load at the press position at the constant distance interval by the slope calculation unit, according to a first regression line, wherein the slope of the load is calculated by the following formula (i), $$\text{the slope of the load} = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2};  \quad \text{[Formula (i)]}$$

fifth step of calculating the value of the slope of the slope of the load as an amount of change of an amount of change of a load value with respect to the press position by using the formula (i) for calculating a slope of the first regression line, according to a second regression line, wherein, in the formula (i), n denotes a number of data, xi denotes data of a pressurization part, and yi denotes data of the load; and a sixth step of comparing the calculated value of the slope of the slope of the load with values serving as references to determine stop or judge by the determination unit.

* * * * *